United States Patent
Kato et al.

(10) Patent No.: US 10,281,798 B2
(45) Date of Patent: May 7, 2019

(54) WAVELENGTH CONVERSION DEVICE, CONTROL-LIGHT GENERATION DEVICE, WAVELENGTH CONVERSION METHOD, AND CONTROL-LIGHT GENERATION METHOD

(71) Applicant: FUJITSU LIMITED, Kawasaki-shi, Kanagawa (JP)

(72) Inventors: Tomoyuki Kato, Yokohama (JP); Shigeki Watanabe, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/950,806

(22) Filed: Apr. 11, 2018

(65) Prior Publication Data
US 2018/0307119 A1    Oct. 25, 2018

(30) Foreign Application Priority Data
Apr. 19, 2017    (JP) .................................. 2017-082647

(51) Int. Cl.
*G02F 2/00*    (2006.01)
*G02B 6/27*    (2006.01)
(Continued)

(52) U.S. Cl.
CPC ............. *G02F 2/004* (2013.01); *G02B 6/272* (2013.01); *G02F 1/353* (2013.01); *G02F 1/395* (2013.01);
(Continued)

(58) Field of Classification Search
CPC ....................................................... G02F 1/395
See application file for complete search history.

(56) References Cited

U.S. PATENT DOCUMENTS

| | | | | |
|---|---|---|---|---|
| 6,867,903 | B2 * | 3/2005 | Imajuku | G02F 1/3517 |
| | | | | 359/330 |
| 7,092,146 | B2 * | 8/2006 | Kim | G02F 2/004 |
| | | | | 359/326 |

(Continued)

FOREIGN PATENT DOCUMENTS

| | | |
|---|---|---|
| JP | 04-045428 | 2/1992 |
| JP | 04-136823 | 5/1992 |

(Continued)

*Primary Examiner* — Rhonda S Peace
(74) *Attorney, Agent, or Firm* — Fujitsu Patent Center

(57) ABSTRACT

A wavelength conversion device that converts input signal light having a first frequency into output signal light having a second frequency, includes: a control-light generator that outputs first continuous oscillation light and second continuous oscillation light; and a nonlinear optical medium that cross-phase modulates the input signal light with the first continuous oscillation light and the second continuous oscillation light and generates the output signal light, wherein the control-light generator outputs the first continuous oscillation light and the second continuous oscillation light to have polarized waves in directions orthogonal to each other and have a frequency interval equal to a difference between the first frequency and the second frequency and controls, based on intensity of the output signal light, timings of modulation of phases of the first continuous oscillation light and the second continuous oscillation light to be aligned with each other.

6 Claims, 12 Drawing Sheets

(51) Int. Cl.
*G02F 1/35* (2006.01)
*G02F 1/39* (2006.01)

(52) U.S. Cl.
CPC .... *G02F 2002/006* (2013.01); *G02F 2201/02* (2013.01); *G02F 2203/06* (2013.01)

(56) References Cited

U.S. PATENT DOCUMENTS

| | | | |
|---|---|---|---|
| 7,103,285 B1 | 9/2006 | Okuno | |
| 7,715,730 B2 * | 5/2010 | Hecker | G02B 6/272 |
| | | | 359/245 |
| 2005/0100281 A1 * | 5/2005 | Kim | G02F 1/0123 |
| | | | 385/39 |

FOREIGN PATENT DOCUMENTS

| | | |
|---|---|---|
| JP | 10-232415 | 9/1998 |
| JP | 2008-076752 | 4/2008 |
| WO | 00/062382 | 10/2000 |

* cited by examiner

FIG. 3A
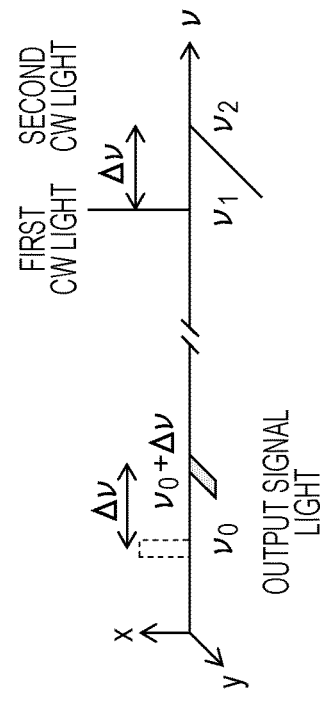
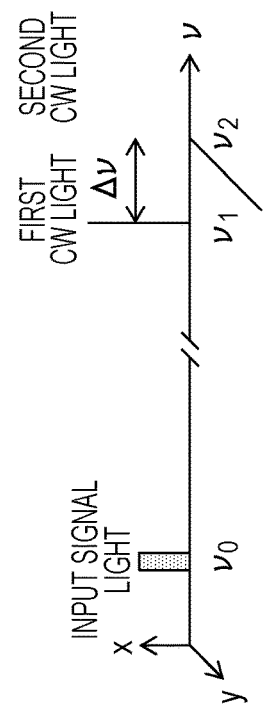
FIG. 3B
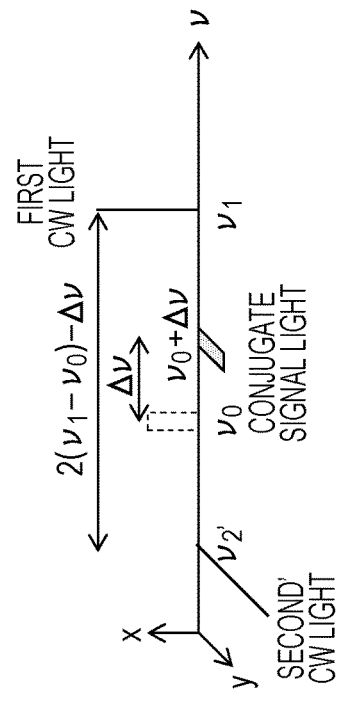
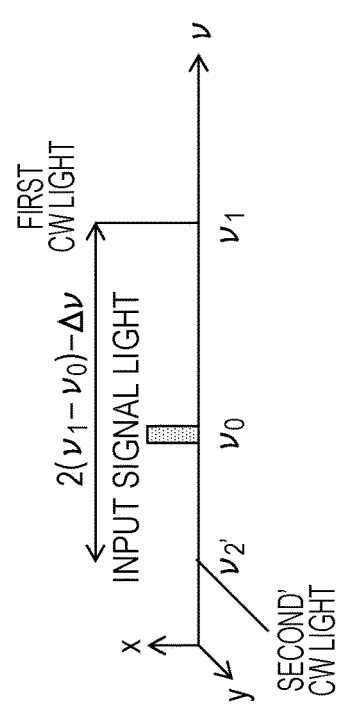

WAVELENGTH CONVERSION DEVICE, CONTROL-LIGHT GENERATION DEVICE, WAVELENGTH CONVERSION METHOD, AND CONTROL-LIGHT GENERATION METHOD

CROSS-REFERENCE TO RELATED APPLICATION

This application is based upon and claims the benefit of priority of the prior Japanese Patent Application No. 2017-82647, filed on Apr. 19, 2017, the entire contents of which are incorporated herein by reference.

FIELD

The embodiments discussed herein are related to a wavelength conversion device, a control-light generation device, a wavelength conversion method, and a control-light generation method.

BACKGROUND

In the optical communication field, for expansion of a transmission capacity and flexible use of a network, there have been demands for a wavelength conversion technique for freely converting a carrier light frequency (wavelength) of signal light. The wavelength conversion technique is realized using optical to electrical and electrical to optical signal conversion, an optical vector modulator, a nonlinear optical medium, or the like.

The optical to electrical and electrical to optical signal conversion is wavelength conversion performed by converting an optical signal into an electrical signal, performing wavelength conversion on the electrical signal, and regenerating the electrical signal to the optical signal. It is possible to generate an optical signal having a desired wavelength via the optical to electrical and electrical to optical signal conversion. However, an electric circuit corresponding to a modulation format of the optical signal may be requested. Power consumption increases when the capacity of the optical signal to be converted increases. The light vector converter has a limit in a conversion band. Conversion into different wavelength grids is difficult.

On the other hand, in wavelength conversion performed using a nonlinear optical effect, processing not depending on a modulation format is possible. There is no limit in a frequency band that may be converted. It is possible to perform wavelength conversion of optical signals in a wide frequency band.

Examples of related art are described in Japanese Laid-open Patent Publication Nos. 2008-76752 and 4-136823.

However, in the wavelength conversion performed using the nonlinear optical effect, when conversion efficiency is low, the quality of an optical signal after conversion is deteriorated and a transmission distance decreases. On the other hand, it is conceivable to increase the intensity of control light made incident on a nonlinear optical medium to increase the conversion efficiency.

However, when the intensity of the optical signal input to the nonlinear optical medium is large, induced Brillouin scattering occurs. As a result, signal quality is deteriorated.

SUMMARY

According to an aspect of the embodiments, a wavelength conversion device that converts input signal light having a first frequency into output signal light having a second frequency, includes: a control-light generator that outputs first continuous oscillation light and second continuous oscillation light; and a nonlinear optical medium that cross-phase modulates the input signal light with the first continuous oscillation light and the second continuous oscillation light and generates the output signal light, wherein the control-light generator outputs the first continuous oscillation light and the second continuous oscillation light to have polarized waves in directions orthogonal to each other and have a frequency interval equal to a difference between the first frequency and the second frequency and controls, based on intensity of the output signal light, timings of modulation of phases of the first continuous oscillation light and the second continuous oscillation light to be aligned with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams illustrating a concept of wavelength conversion in all embodiments;

DESCRIPTION OF EMBODIMENTS

Wavelength converters according to embodiments explained below perform wavelength conversion of input signal light using signal light input to the wavelength converter (also referred to as input signal light) and first control light and second control light. More specifically, refractive index fluctuation is caused by incidence of these lights on a nonlinear optical medium explained below. The lights are subjected to cross-phase modulation by the refractive index modulation. Light obtained by the cross-phase modulation is transmitted through a polarizer having a polarization axis orthogonal to the original input signal light, whereby signal light wavelength-converted into any desired wavelength is obtained.

Note that the first and second control lights are respectively generated from continuous oscillation lights (also referred to as CW lights; CW: Continuous wave) having polarized waves in one direction or multiple directions (the polarized waves are also polarized waves of an electric field). In detail, the first and second control lights are respectively generated by continuous oscillation lights having single polarized waves or continuous oscillation lights or respectively generated by continuous oscillation lights subjected to polarization multiplexing. In the former case, a polarization direction of the first control light and a polarization direction of the second control light are orthogonal to each other. In the latter case, polarization directions of two polarized waves of the continuous oscillation lights are orthogonal to each other. In wavelength converters 21 to 24 according to first to fourth embodiments explained below, control light is also referred to as continuous oscillation light unless specifically noted otherwise.

When modulation timings of phase modulation applied to the first and second continuous oscillation lights shift from each other, signal quality of an optical signal after wavelength conversion is deteriorated. Therefore, in the embodiments explained below, phase modulation with modulation timings aligned with each other is applied to the first and second continuous oscillation lights. Consequently, conversion efficiency is improved without deterioration in signal quality.

Further, in the case of input signal light in any polarization state, the input signal light is separated into orthogonal two polarized wave components. The wavelength conversion is performed on the respective polarized wave components. Thereafter, wavelength conversion without polarization dependency is realized by multiplexing the polarized wave components.

Figure 1:
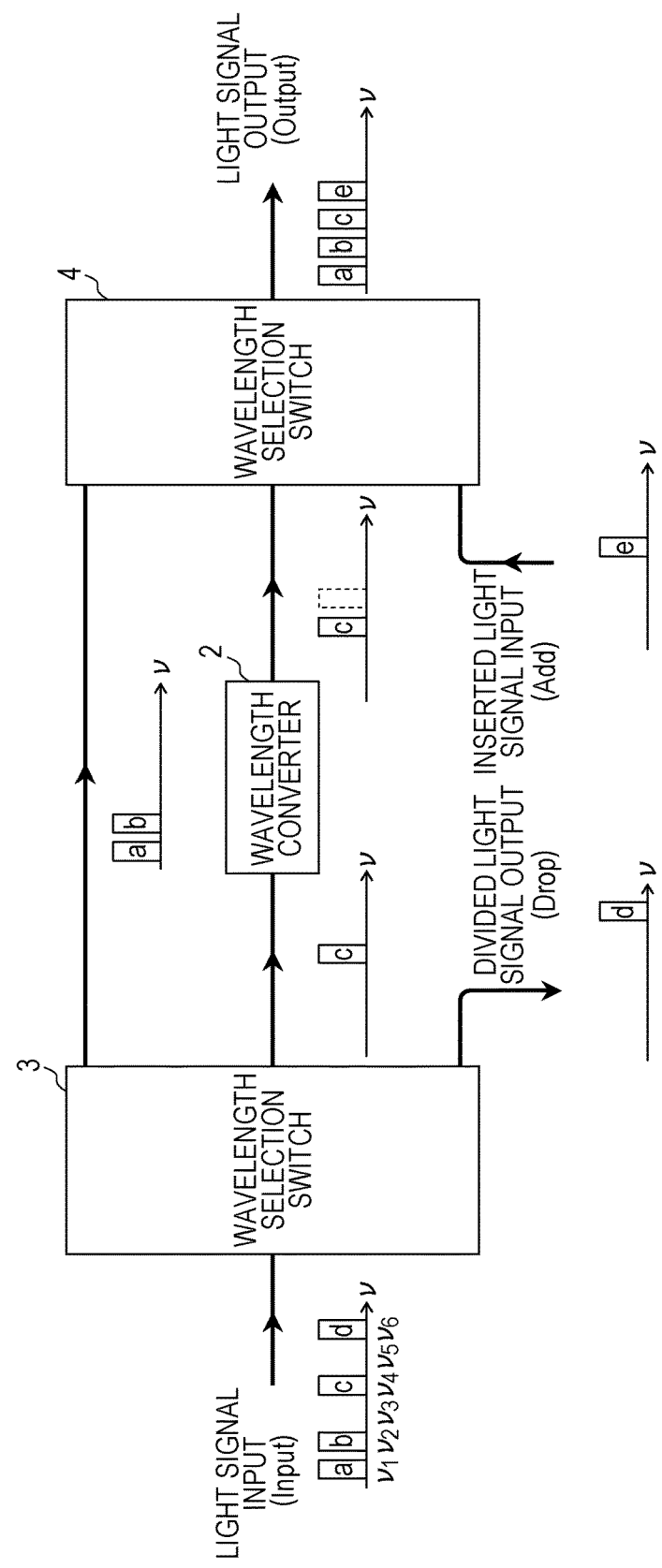
FIG. 1 is a diagram illustrating an embodiment of an optical add-drop multiplexer.

The wavelength conversion is explained in detail below. An optical add-drop multiplexer 1, an example of which is illustrated in FIG. 1, may be realized by the wavelength conversion. The optical add-drop multiplexer 1 includes a wavelength converter 2 and wavelength-selective switches 3 and 4. The wavelength converter 2 may be any one of wavelength converters 21, 22, 23, and 24 explained below.

In a wavelength division multiplex (WDM) signal input from an optical signal input (Input) port, signal light having any frequency is selected by the wavelength-selective switch 3. The signal light is divided to the wavelength-selective switch 4, the wavelength converter 2, and a divided optical signal output (Drop) port. The wavelength converter 2 converts (shifts) the frequency of the input optical signal into a different frequency. The wavelength-selective switch 4 multiplexes signal lights output from the wavelength-selective switch 3, the wavelength converter 2, and an inserted optical signal input (Add) port and outputs a signal light after the multiplexing to an optical signal output (Output) port. In FIG. 1, ν and $\nu_i$ (i is an integer of 1 to 6) indicate frequencies of light and a, b, c, d, and e respectively indicate optical signals in frequency bands.

In a method of light insertion and division in the past, signal light, the frequency of which is desired to be converted, is output to the Drop port, subjected to optical to electrical signal conversion, and converted into an electric signal. The frequency of the electric signal is converted into a desired frequency. The electric signal after the conversion is restored to the optical signal by electrical to optical signal conversion. Subsequently, the optical signal obtained by the electricity/light conversion is input from the Add port. For example, in FIG. 1, the optical signal, the frequency of which is desired to be converted, is "d". The optical signal "d" is output to the Drop port, subjected to light/electricity/light conversion and wavelength conversion, and converted into a desired optical signal "e".

However, in the optical add-drop multiplexer 1 in which the wavelength converter 2 is used, it is possible to convert the frequency of signal light not via light/electricity/light conversion. In FIG. 1, frequency conversion of optical signal "c" is performed by the wavelength converter 2 not via light/electricity/light conversion. The optical signal "c" wavelength-converted from an original input signal (c) is output.

In the technique in the past, a WDM signal for input is subjected to light/electricity conversion. A WDM signal for output is generated using an optical transmitter having a new frequency grid. However, in a WDM signal multiplexing device in which the wavelength converter 2 is used, it is possible to multiplex a WDM signal not via light/electricity conversion.

Various embodiments (wavelength converters 21, 22, 23, and 24) of the wavelength converters 2 for realizing the wavelength conversion explained above and the operations of the wavelength converters 21, 22, 23, and 24 are explained in detail.

First Embodiment

Figure 2:
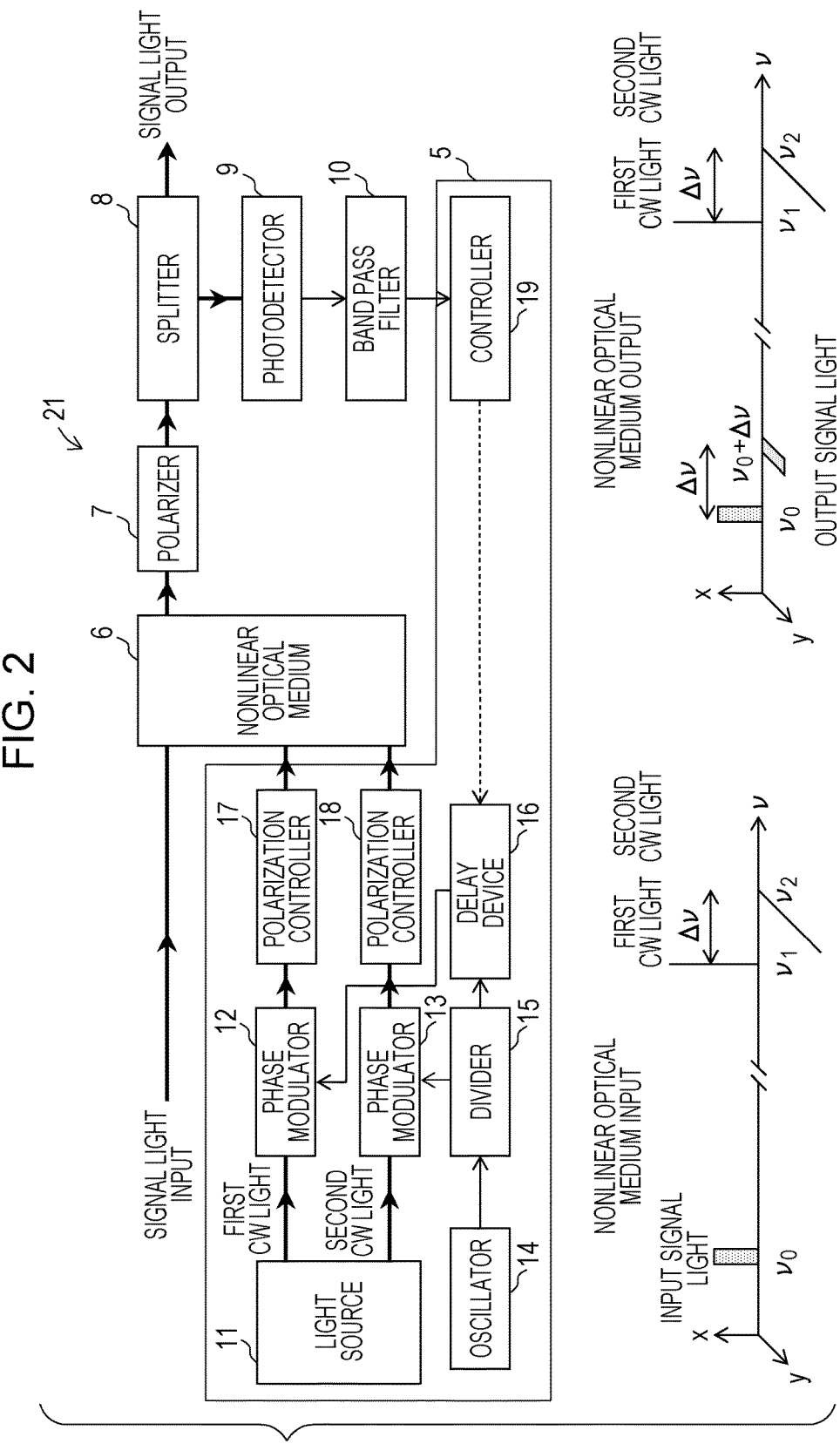
FIG. 2 is a diagram illustrating an example of a wavelength converter according to a first embodiment and a basic concept of wavelength conversion processing.

FIG. 2 is a diagram illustrating an example of the wavelength converter 21 according to a first embodiment. FIG. 2 is a diagram illustrating a basic concept concerning wavelength conversion processing.

The wavelength converter 21 illustrated in FIG. 2 includes a control light generator 5, a nonlinear optical medium 6, a polarizer 7, a splitter 8, a photodetector 9, and a band pass filter 10. The control light generator 5 includes a light source 11, phase modulators 12 and 13, an oscillator 14, a divider 15, a delay device 16, polarization controllers 17 and 18 and a controller 19. The photodetector 9, the band pass filter 10, the controller 19, and the delay device 16 realize a circuit for feedback explained below.

Signal light of single wavelength light or WDM light is input to the wavelength converter 21. The frequency of this input signal light is represented as $\nu_0$ and is also referred to as first frequency. The input signal light input to the wavelength converter 21 according to the first embodiment is assumed to be a single polarized wave.

The light source 11 is, for example, a laser light source. The light source 11 generates first continuous oscillation light (first CW light) and second continuous oscillation light (second CW light) functioning as carrier waves. Respective frequencies of the first continuous oscillation light and the second continuous oscillation light are represented as $\nu_1$ and $\nu_2$. Note that relations of $\nu_1 \neq \nu_0$ and $\nu_2 \neq \nu_0$ hold among $\nu_0$, $\nu_1$, and $\nu_2$. In the first embodiment, polarized waves of the first and second continuous oscillation lights are respectively single polarized waves. A polarization direction of the first continuous oscillation light is parallel to a polarization direction of the input signal light. A polarization direction of the second continuous oscillation light is orthogonal to the polarization direction of the input signal light.

FIGS. 3A and 3B are diagrams illustrating a concept of wavelength conversion in all embodiments. As illustrated in FIG. 3A, both of the frequencies $\nu_1$ and $\nu_2$ are frequencies outside a transmission band and are frequencies present on a low frequency side or a high frequency side. $\nu_2 - \nu_1$ is equal to a difference $\Delta\nu$ between the frequency of the input signal light and the frequency of signal light output from the wavelength converter 2 (hereinafter, output signal light). By adjusting $v_1$ and $v_2$ with the control light generator 5, it is possible to set $\Delta v$ to any desired value. Consequently, it is possible to obtain output signal light having a desired frequency.

Referring back to FIG. 2, the light source 11 may generate second' continuous oscillation light having a frequency $v_{2'}$ instead of the second continuous oscillation light (FIG. 3B). In FIG. 3B, $v_{2'}$ is a frequency outside the transmission band on the low frequency side or the high frequency side. A relation of $|v_i-v_{2'}|=|2(v_1-v_0)-\Delta v|$ holds. FIG. 3B is a diagram for explaining an example of wavelength arrangement of lights at the time when the control light generator 5 generates the second' continuous oscillation light instead of the second continuous oscillation light. In FIG. 3B, the first continuous oscillation light is present on the high frequency side and the second' continuous oscillation light is present on the low frequency side. A relation of $v_1-v_{2'}=2(v_1-v_0)-\Delta v$ holds. By using the first and second' continuous oscillation lights for wavelength conversion according to the first embodiment and second to fourth embodiments explained below as in the case of FIG. 3B, it is possible to obtain output signal light that is phase conjugate with the input signal light.

It is explained below, for example, why the frequency of the output signal light is shifted by $\Delta v$ in the respective cases of the wavelength conversion performed using the first and second continuous oscillation lights and the wavelength conversion performed using the first and second' continuous oscillation lights. In the following description, the first and second continuous oscillation lights are used unless specifically noted otherwise.

In FIG. 2, the phase modulator 12 phase-modulates the first continuous oscillation light. The phase modulation by the phase modulator 12 is performed using a signal output from the oscillator 14. Explaining more in detail, the signal output from the oscillator 14 is divided by the divider 15. One of divided signals is input to the delay device 16. The other is input to the phase modulator 13. The signal input to the delay device 16 is output to the phase modulator 12 after a delay amount is adjusted by the delay device 16. The phase modulator 12 phase-modulates the first continuous oscillation light to align phase conversion timings of the first continuous oscillation light and the second continuous oscillation light according to the signal output from the delay device 16.

The phase modulator 13 phase-modulates the second continuous oscillation light with the output signal from the oscillator 14 divided by the divider 15.

The polarization controller 17 controls the polarization direction of the first continuous oscillation light to be equal to the polarization direction of the input signal light.

The polarization controller 18 controls the polarization direction of the second continuous oscillation light to be a direction orthogonal to the polarization directions of the input signal light and the first continuous oscillation light.

The first continuous oscillation light emitted from the light source 11 is phase-modulated by the phase modulator 12. The polarization direction of the first continuous oscillation light is controlled by the polarization controller 17. The first continuous oscillation light is output from the control light generator 5.

The second continuous oscillation light emitted from the light source 11 is phase-modulated by the phase modulator 13. The polarization direction of the second continuous oscillation light is controlled by the polarization controller 18. The second continuous oscillation light is output from the control light generator 5.

The nonlinear optical medium 6 is realized by, for example, an optical fiber (in particular, a highly-nonlinear fiber), a high refractive index difference optical waveguide including silicon or the like in a core, or a periodic polarization electric optical crystal.

A plurality of optical signals having different frequencies, that is, the input signal light, the first continuous oscillation light, and the second continuous oscillation light are made incident on the nonlinear optical medium 6. At this time, in the nonlinear optical medium 6, a nonlinear optical effect such as four-wave mixing and/or cross-phase modulation occurs. Idler light (also referred to as wavelength-converted light) having a frequency $v_0+\Delta v$ is generated by the nonlinear optical effect. A polarization direction of the idler light is a direction orthogonal to the input signal light. Note that the frequency $v_0+\Delta v$ is also referred to as second frequency.

The polarizer 7 transmits light in a polarization direction orthogonal to the polarization direction of the input signal light. Therefore, the polarizer 7 transmits the idler light having the frequency $v_0+\Delta v$ and rejects the input signal light. A data modulation component of the idler light is equal to a data modulation component of the input signal light as explained below. Therefore, by extracting the idler light as the output signal light, it is possible to extract original data input from the input side. Note that an extinction ratio of the input signal light to the output signal light is decided from a polarization extinction ratio of the polarizer 7.

The splitter 8 divides the output signal light and guides one of divided output signal lights to the photodetector 9 and guides the other output signal light to an output signal port side. At this time, the signal light guided to the photodetector 9 is signal light used for feedback and is a component having a low frequency (also referred to as low-frequency component or low frequency signal) in the signal light. The low-frequency component is used for the feedback in order to reduce power consumption without using a high-speed photoelectric conversion circuit.

The photodetector 9 converts the low-frequency component of the output signal light input to the photodetector 9 into an electric signal.

The band pass filter 10 transmits an electric signal in a part of a signal band of the electric signal converted by the photodetector 9 and outputs the electric signal to the controller 19.

The controller 19 controls the delay device 16 to maximize the intensity of the electric signal output from the band pass filter 10. The intensity of the electric signal is larger as the intensity of the output signal light is larger. Therefore, in order to maximize the intensity of the output signal light, the controller 19 controls modulation of a phase of the first continuous oscillation light by controlling the delay device 16. That is, the controller 19 receives the feedback of the intensity of the output signal light and controls timings of the phase modulation of the first and second continuous oscillation lights to coincide with each other to thereby reduce deterioration of the output signal light. The controller 19 calculates, based on the input electric signal intensity, a delay amount of the timing of the phase modulation of the first continuous oscillation light with which the timings of the phase modulation of the first and second continuous oscillation lights coincide with each other. The controller 19 controls the delay device 16 to perform processing using the calculated delay amount.

The delay device 16 receives the instruction from the controller 19 and adjusts a signal output from the oscillator 14 using the delay amount received from the controller 19.

The delay device 16 outputs the signal after the adjustment to the first phase modulator 12.

The timings of the phase modulation of the first continuous oscillation light and the second continuous oscillation light are aligned by the feedback control explained above.

A reduction of deterioration of the output signal light by the alignment of the timings of the phase modulation of the first continuous oscillation light and the second continuous oscillation light is explained.

An electric field $E_0(t)$ of the input signal light is represented as $$E_0(t) = (E_{0r}(t) + iE_{0i}(t))\exp(2\pi i\nu_0 t) \qquad (1),$$

where t represents time, $E_{0r}(t)$ represents a real part of the data modulation component, $E_{0i}(t)$ represents an imaginary part of the data modulation component.

An electric field $E_1(t)$ of the first continuous oscillation light is represented as $$E_1(t) = E_1 \exp(2\pi i\nu_1 t + \theta_1(t)) \qquad (2),$$

where $E_1$ represents constant electric field intensity of the first continuous oscillation light and $\theta_1(t)$ represents a modulation phase applied to the first continuous oscillation light at the time t.

An electric field $E_2(t)$ of the second continuous oscillation light is represented as $$E_2(t) = E_2 \exp(2\pi i\nu_2 t + \theta_2(t)) \qquad (3),$$

where $E_2$ represents constant electric field intensity of the second continuous oscillation light and $\theta_2(t)$ represents a modulation phase applied to the second continuous oscillation light at the time t.

When the input signal light and the first and second continuous oscillation lights are input to the nonlinear optical medium 6, refractive index fluctuation is caused in the nonlinear optical medium 6 by the first continuous oscillation light and the input signal light. Since the second continuous oscillation light is phase-modulated by the refractive index fluctuation, output signal light, an electric field Eout(t) of which is represented by the following Expression (4), is output:

$$\text{Eout}(t) = J_1(\gamma L E_1(E_{0r}(t) + iE_{0i}(t)))E_2 \exp\{2\pi i(\nu_2 + \nu_0 - \nu_1)t + \theta_2(t) - \theta_1(t)\} \qquad (4),$$

where $\gamma$ represents a nonlinear optical coefficient of the nonlinear optical medium 6, L represents the length of the nonlinear optical medium 6, and $J_1(m)$ represents a first order Bessel function of the first kind.

From Expression (1) and Expression (4), a frequency difference $\Delta\nu$ between the input signal light and the output signal light is calculated as $$\Delta\nu = (\nu_2 + \nu_0 - \nu_1) - \nu_0 = \nu_2 - \nu_1 \qquad (5).$$

From this, it is understood that the frequency difference between the input signal light and the output signal light and a frequency difference between the first continuous oscillation light and the second continuous oscillation light are equal.

$J_1(\gamma L E_1(E_{0r}(t) + iE_{0i}(t)))E_2$ in Expression (4) is a data modulation component of the output signal light. If a phase modulation degree is sufficiently small, the data modulation component may be modified as follows:

$$J_1(\gamma L E_1(E_{0r}(t) + iE_{0i}(t)))E_2 = \eta(E_{0r}(t) + iE_{0i}(t)) \qquad (6),$$

where, $\eta$ represents conversion efficiency.

$\theta_2(t) - \theta_1(t)$ of Expression (4) is a noise component due to phase modulation applied to the first continuous oscillation light and the second continuous oscillation light. By setting $$\theta_2(t) - \theta_1(t) = 0 \qquad (7),$$

that is, setting $\theta_1(t)$ and $\theta_2(t)$ to the in-phase, signal deterioration due to the phase modulation applied to the first continuous oscillation light and the second continuous oscillation light may be reduced.

Referring back to FIG. 2, the controller 19 in the feedback circuit monitors electric signal intensity calculates delay amounts of phase modulation of the continuous signal lights such that the electric signal intensity is maximized, that is, a value of the noise component $\theta_2(t) - \theta_1(t)$ is zero. The delay device 16 delays an output signal from the oscillator 14 by the delay amount calculated by the controller 19 and outputs the output signal to the phase modulator 12.

Similarly, phase modulation timed to coincide with the first continuous oscillation light and the second' continuous oscillation light and a reduction of deterioration of the output signal light, an example of which is illustrated in FIG. 3B, are explained.

An electric field $E_{2'}(t)$ of the second' continuous oscillation light is represented as $$E_{2'}(t) = E_{2'} \exp(2\pi i\nu_{2'} t + \theta_{2'}(t)) \qquad (8),$$

where $E_{2'}$ represents constant electric field intensity of the second' continuous oscillation light and $\theta_{2'}(t)$ represents a modulation phase applied to the second' continuous oscillation light at the time t. Note that the electric field $E_0$ of the input signal light is represented by Expression (1) and the first continuous oscillation light is represented by Expression (2) as explained above.

When the input signal light and the first and second' continuous oscillation lights are input to the nonlinear optical medium 6, refractive index fluctuation is caused in the nonlinear optical medium 6 by the first continuous oscillation light and the input signal light. The second' continuous oscillation light is phase-modulated by the refractive index modulation. Output signal light, the electric field Eout(t) of which is represented by the following Expression (9), is output:

$$\text{Eout}(t) = J_1(\gamma L E_1(E_{0r}(t) - iE_{0i}(t)))E_{2'} \exp\{2\pi i(\nu_{2'} + \nu_1 - \nu_0)t + \theta_{2'}(t) + \theta_1(t)\} \qquad (9)$$

At this time, the frequency difference $\Delta\nu$ between the input signal light and the output signal light is calculated as $$\Delta\nu = (\nu_{2'} + \nu_1 - \nu_0) - \nu_0 = \nu_{2'} + \nu_1 - 2\nu_0 \qquad (10)$$

A frequency difference between the first continuous oscillation light and the second' continuous oscillation light is represented as follow using $\Delta\nu$ of Expression (10):

$$\nu_1 - \nu_2 = 2(\nu_1 - \nu_0) - \Delta\nu \qquad (11)$$

$J_1(\gamma L E_1(E_{0r}(t) - iE_{0i}(t)))E_{2'}$ in Expression (9) is a data conversion component of the output signal light. If a phase modulation degree is sufficiently small, the data modulation component is represented as follows:

$$J_1(\gamma L E_1(E_{0r}(t) - iE_{0i}(t)))E_{2'} = \eta(E_{0r}(t) - iE_{0i}(t)) \qquad (12),$$

where $\eta$ represents conversion efficiency.

The data modulation component of the output signal light represented by Expression (12) is in a relation of complex conjugate with the data modulation component of the input signal light. Such an output signal light is referred to as conjugate signal light with respect to the input signal light.

$\theta_{2'}(t) + \theta_1(t)$ in Expression (9) is a noise component due to phase modulation applied to the first continuous oscillation light and the second' continuous oscillation light. By setting $$\theta_{2'}(t) + \theta_1(t) = 0 \qquad (13),$$

that is, by setting $\theta_1(t)$ and $\theta_2(t)$ to opposite phases, it is possible to reduce deterioration of the output signal light.

In the first embodiment, by using the nonlinear optical effect, it is possible to make it unnecessary to provide a light/electricity/optical signal conversion circuit for wavelength conversion. Consequently, it is possible to reduce power consumption. In the wavelength conversion according to the first embodiment, since $\Delta v$ may take any value, it is possible to perform conversion into different wavelength grids. It is possible to realize wavelength conversion in a wide band. By aligning timings of phase modulation of two continuous oscillation lights, it is possible to reduce a noise component such as induced Brillouin scattering.

Accuracy of the differential frequency explained above is decided by frequency accuracies of the first continuous oscillation light and the second continuous oscillation light. In an example of the first embodiment, the accuracy of the differential frequency may be set to approximately several gigahertz.

Second Embodiment

Figure 4:
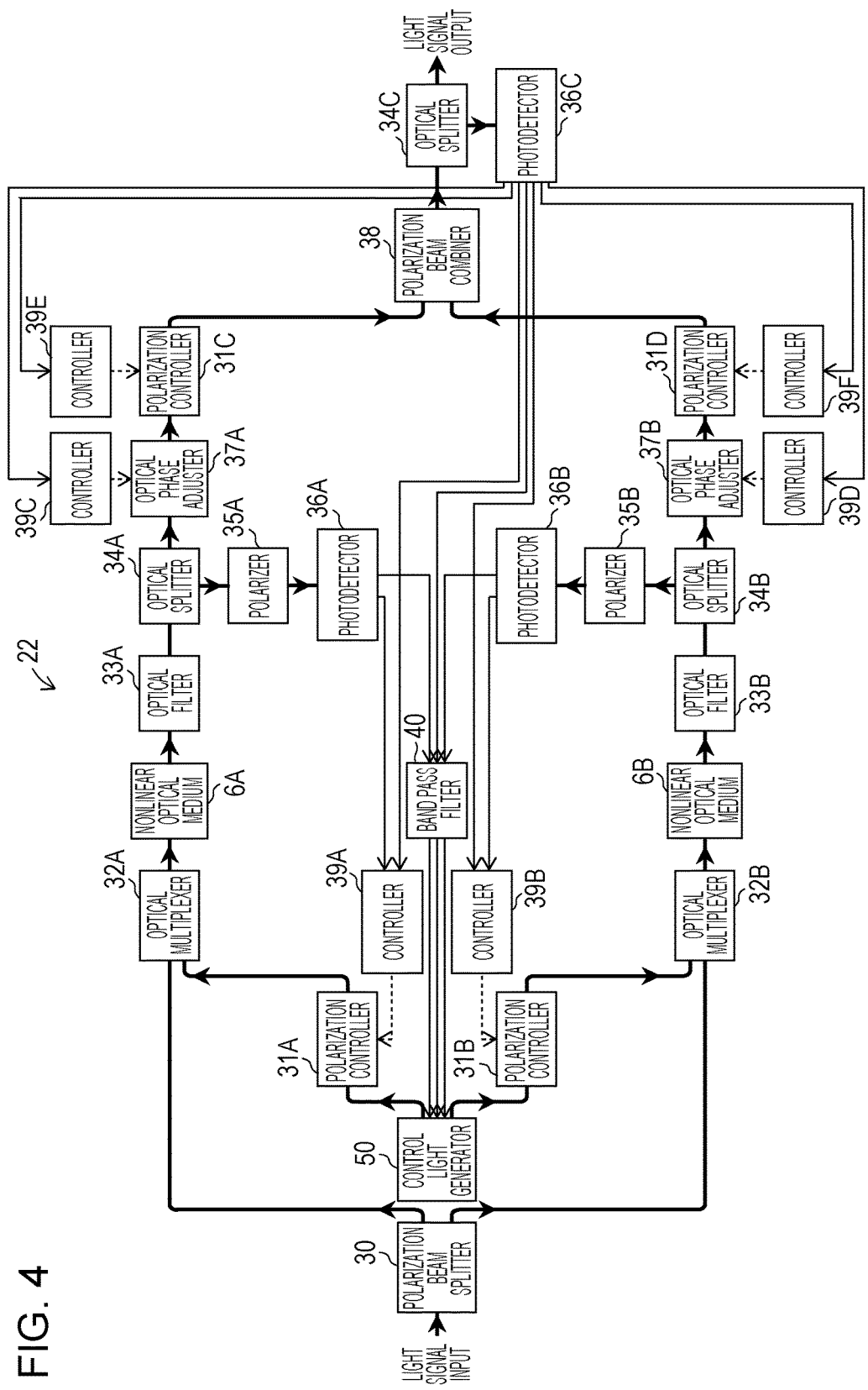
FIG. 4 is a diagram illustrating an example of a wavelength converter according to a second embodiment.

FIG. 4 illustrates an example of the wavelength converter 22 according to a second embodiment.

The wavelength converter 22 according to the second embodiment polarizes and separates input signal light having a frequency $v_0$ in any polarization state (polarization multiplexing or the like) and individually performs wavelength conversion processing on respective polarized wave components. Consequently, wavelength conversion without polarization dependency is realized.

The wavelength converter 22 according to the second embodiment includes, as illustrated in FIG. 4, a polarization beam splitter 30, a control light generator 50, and polarization controllers 31A, 31B, 31C, and 31D. The wavelength converter 22 includes optical multiplexers 32A and 32B, nonlinear optical media 6A and 6B, optical filters 33A and 33B, optical splitters 34A, 34B, and 34C, and polarizers 35A and 35B. Further, the wavelength converter 22 includes photodetectors 36A, 36B, and 36C, optical phase adjusters 37A and 37B, a polarization beam combiner 38, controllers 39A, 39B, 39C, 39D, 39E, and 39F, and a band pass filter 40.

The polarization beam splitter 30 separates an input signal light into two orthogonal polarized wave components and outputs a horizontal polarized wave component to the optical multiplexer 32A and outputs a vertical polarized wave component to the optical multiplexer 32B. The polarization beam splitter is hereinafter also referred to as polarization optical separating device or separating device.

The control light generator 50 outputs first continuous oscillation light having a frequency $v_1$ and second continuous oscillation light having a frequency $v_2$ to the polarization controller 31A. That is, the control light generator 50 outputs first control light obtained by multiplexing the first continuous oscillation light and the second continuous oscillation light to the polarization controller 31A. Note that respective polarization directions of the first continuous oscillation light and the second continuous oscillation light are orthogonal to each other. The control light generator 50 outputs third continuous oscillation light having a frequency $v_3$ and fourth continuous oscillation light having a frequency $v_4$ to the polarization controller 31B. That is, the control light generator 50 outputs second control light obtained by multiplexing the third continuous oscillation light and the fourth continuous oscillation light to the polarization controller 31B. Respective polarization directions of the third continuous oscillation light and the fourth continuous oscillation light are orthogonal to each other. A difference between the frequencies of the first continuous oscillation light and the second continuous oscillation light and a difference between the frequencies of the third continuous oscillation light and the fourth continuous oscillation light are respectively equal to a shift amount from the frequency of the input signal light to the frequency of the output signal light. That is, $$\Delta v = |v_2 - v_1| = |v_4 - v_3| \quad (14).$$

The frequencies $v_1$, $v_2$, $v_3$, and $v_4$ may be different from one another or may be, for example, $v_1 = v_4$ and $v_2 = v_3$. For example, polarization states of the first and fourth continuous oscillation lights may be the same as each other and polarization states of the second and third continuous oscillation lights may be the same as each other. The polarization states of the continuous oscillation lights may be different from each other. The same applies to third and fourth embodiments explained below.

The polarization controller 31A controls the first continuous oscillation light output from the control light generator 50 to be a horizontal polarized wave and controls the second continuous oscillation light output from the control light generator 50 to be a vertical polarized wave and outputs the continuous oscillation lights after the control to the optical multiplexer 32A.

The polarization controller 31B controls the third continuous oscillation light output from the control light generator 50 to be a vertical polarized wave and controls the fourth continuous oscillation light output from the control light generator 50 to be a horizontal polarized wave and outputs the continuous oscillation lights after the control to the optical multiplexer 32B.

The optical multiplexer 32A multiplexes the first continuous oscillation light and the second continuous oscillation light output from the polarization controller 31A and the horizontal polarized wave component of the input signal light output from the polarization beam splitter 30 and outputs multiplexed light of the first continuous oscillation light, the second continuous oscillation light, and the horizontal polarized wave component of the input signal light to the nonlinear optical medium 6A.

In the nonlinear optical medium 6A, a nonlinear optical effect is caused by the input of the horizontal polarized wave component of the input signal light, the first continuous oscillation light, and the second continuous oscillation light. First idler light having a frequency $v_0 + \Delta v$ is generated. The first idler light is a polarized wave in the vertical direction. The first idler light has a modulation component of an electric field equal to a data modulation component of the horizontal polarized wave component of the input signal light. Therefore, it is possible to extract data in the horizontal polarized wave component of the input signal light by extracting the first idler light. Therefore, the first idler light may be considered signal light. The first idler light is output from the nonlinear optical medium 6A to the optical filter 33A.

The optical filter 33A transmits an optical signal having a frequency in a transmission band and does not transmit optical signals in a high-frequency domain and a low-frequency domain outside the transmission band. Therefore, the optical filter 33A blocks transmission of continuous oscillation light in light output from the nonlinear optical medium 6A, transmits the first idler light, the frequency $v_0 + \Delta v$ of which is present in the transmission band, and outputs the first idler light to the optical splitter 34A.

The optical splitter 34A divides the optical signal output from the optical filter 33A and outputs one of divided optical signals to the optical phase adjuster 37A and outputs the other to the polarizer 35A. At this time, the signal light output to the polarizer 35A is the first idler light as in the case of the first embodiment.

The polarizer 35A is a polarizer that transmits a signal of a vertical polarized wave and does not transmit a signal of a horizontal polarized wave. Therefore, the polarizer 35A blocks transmission of the input signal light in the light output from the nonlinear optical medium 6A and outputs the first idler light to the photodetector 36A.

The photodetector 36A detects the optical signal output from the polarizer 35A, converts the optical signal into an electric signal, and outputs the electric signal to the controller 39A and the band pass filter 40.

The controller 39A controls the polarization controller 31A to maximize the intensity of the electric signal output from the photodetector 36A. The controller 39A controls the polarization controller 31A to maximize the intensity of an electric signal output from the photodetector 36C explained below.

The optical phase adjuster 37A adjusts a phase of the first idler light output from the nonlinear optical medium 6A according to control by the controller 39C and outputs the adjusted first idler light to the polarization controller 31C.

The polarization controller 31C controls a polarization state of the first idler light such that the first idler light output from the optical phase adjuster 37A is transmitted through the polarization beam combiner 38 and outputs the first idler light after the control to the polarization beam combiner 38.

The optical multiplexer 32B multiplexes the third continuous oscillation light and the fourth continuous oscillation light output from the polarization controller 31B and the vertical polarized wave component of the signal light output from the polarization beam splitter 30 and outputs multiplexed light of the third continuous oscillation light, the fourth continuous oscillation light, and a vertical polarized wave component of the signal light to the nonlinear optical medium 6B.

In the nonlinear optical medium 6B, a second idler light having the frequency $v_0 + \Delta v$ is generated by the nonlinear optical effect caused by the input of the vertical polarized wave component of the signal light, the third continuous oscillation light, and the fourth continuous oscillation light. The second idler light is a polarized wave in the horizontal direction. The second idler light has a modulation component of an electric field equal to a data modulation component of the vertical polarized wave component of the input signal light. Therefore, it is possible to extract data in the vertical polarized wave component of the input signal light by extracting the second idler light. Therefore, the second idler light may be considered signal light. The second idler light is output from the nonlinear optical medium 6B to the optical filter 33B.

The optical filter 33B transmits an optical signal having a frequency in a transmission band and does not transmit optical signals in a high-frequency domain and a low-frequency domain outside the transmission band. Therefore, the optical filter 33B blocks transmission of continuous oscillation light in the light output from the nonlinear optical medium 6B and outputs the second idler light, the frequency $v_0 + \Delta v$ of which is present in the transmission band, to the optical splitter 34B.

The optical splitter 34B divides the input second idler light and outputs one of divided idler light components to the optical phase adjuster 37B and outputs the other to the polarizer 35B. At this time, a signal light output to the polarizer 35B is the second idler light as in the case of the first embodiment.

The polarizer 35B is a polarizer that transmits a signal of a horizontal polarized wave and does not transmit a signal of a vertical polarized wave. Therefore, the polarizer 35B blocks transmission of the input signal light output from the nonlinear optical medium 6B and outputs the second idler light to the photodetector 36B.

The photodetector 36B detects the optical signal output from the polarizer 35B, converts the optical signal into an electric signal, and outputs the electric signal to the controller 39B and the band pass filter 40.

The controller 39B controls the polarization controller 31B to maximize the intensity of the electric signal output from the photodetector 36B. The controller 39B controls the polarization controller 31B to maximize the intensity of an electric signal output from the photodetector 36C explained below.

The optical phase adjuster 37B adjusts a phase of the second idler light output from the nonlinear optical medium 6B according to control by the controller 39D and outputs the adjusted second idler light to the polarization controller 31D.

The polarization controller 31D controls a polarization state of the second idler light such that the second idler light output from the optical phase adjuster 37B is transmitted through the polarization beam combiner 38 and outputs the second idler light after the control to the polarization beam combiner 38.

The polarization beam combiner 38 multiplexes the first idler light output from the polarization controller 31C and the second idler light output from the polarization controller 31D to be lights in polarization directions orthogonal to each other and outputs multiplexed light (also referred to as multiplexed signal) of the first idler light and the second idler light to the optical splitter 34C. Note that the polarization beam combiner is also referred to as polarization multiplexing device.

The optical splitter 34C divides the multiplexed light by the first and second idler lights output from the polarization beam combiner 38 and outputs one of divided lights to the photodetector 36C and outputs the other to an output signal light port. The light output to the photodetector 36C is the multiplexed light.

The photodetector 36C detects the multiplexed signal output from the optical splitter 34C, converts the multiplexed signal into an electric signal, and outputs the electric signal to the controllers 39A and 39B and the band pass filter 40. Similarly, the photodetector 36C outputs the electric signal to the controllers 39C, 39D, 39E, and 39F.

The controller 39C controls the optical phase adjuster 37A to adjust, based on the intensity of the electric signal output from the photodetector 36C, the phase of the first idler light output from the nonlinear optical medium 6A.

The controller 39D controls the optical phase adjuster 37B to adjust, based on the intensity of the electric signal output from the photodetector 36C, the phase of the second idler light output from the nonlinear optical medium 6B.

The controller 39E instructs the polarization controller 31C to control, based on the intensity of the electric signal output from the photodetector 36C, polarization of the first idler light output from the nonlinear optical medium 6A.

The controller 39F instructs the polarization controller 31D to control, based on the intensity of the electric signal output from the photodetector 36C, polarization of the second idler light output from the nonlinear optical medium 6B.

The band pass filter 40 transmits an electric signal in a low-frequency domain in a part of bands of the electric signals output from the photodetectors 36A, 36B, and 36C and outputs the electric signal to the control light generator 50.

The control light generator 50 includes a light source that outputs the first to fourth continuous oscillation lights and a circuit and a device for aligning timings of phase modulation of the continuous oscillation lights. The control light generator 50 acquires the intensity of the electric signal output from the band pass filter 40 and aligns, based on the intensity of the electric signal, timings of phase modulation of the continuous oscillation lights.

In the wavelength converter 22 according to the second embodiment, the input signal light is separated into the components of the two polarization directions orthogonal to each other by the polarization beam splitter 30. The four continuous oscillation lights are output from the control light generator 50. The continuous oscillation lights are controlled to be the components parallel to or orthogonal to the polarized wave components of the input signal light by the polarization controller. In this way, the polarization of the input signal light and the polarization of the continuous oscillation lights are respectively adjusted. The wavelength conversion processing is performed on the horizontal polarized wave component and the vertical polarized wave component of the input signal light independently from each other. Consequently, it is possible to perform the wavelength conversion even when the input signal light is a polarized wave in any direction or when the input signal light is polarization-multiplexed. It is possible to highly efficiently acquire data by multiplexing and extracting wavelength-converted polarized wave components.

Third Embodiment

Figure 5:
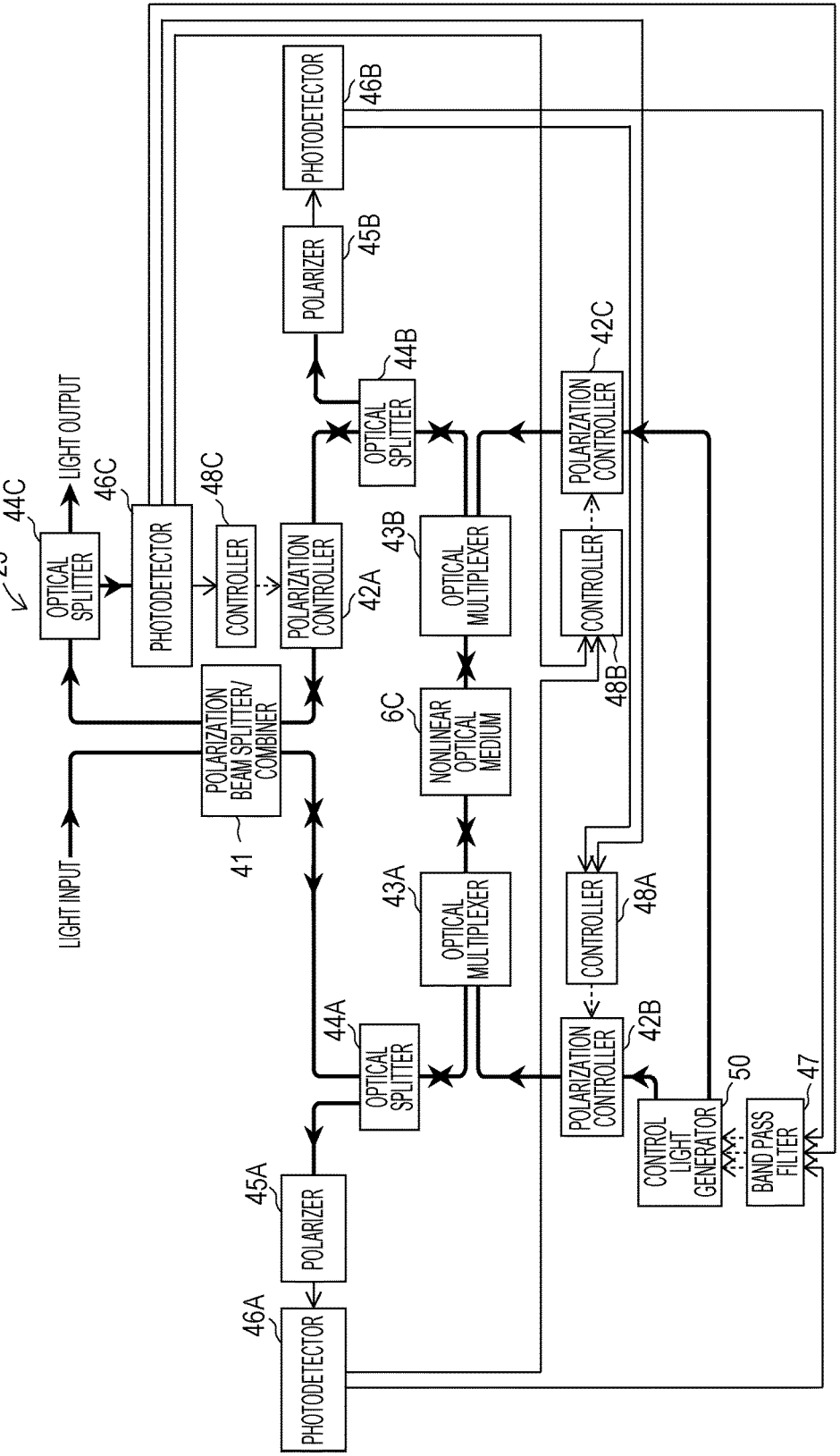
FIG. 5 is a diagram illustrating an example of a wavelength converter according to a third embodiment.

FIG. 5 illustrates an example of the wavelength converter 23 according to a third embodiment. The wavelength converter 23 according to the third embodiment performs optical multiplication without polarization dependency using one nonlinear optical medium 6C.

The wavelength converter 23 according to the third embodiment includes, as illustrated in FIG. 5, a polarization beam splitter/combiner 41, the control light generator 50, polarization controllers 42A, 42B, and 42C, optical multiplexers 43A and 43B, the nonlinear optical medium 6C, and optical splitters 44A and 44B. The wavelength converter 23 includes polarizers 45A and 45B, photodetectors 46A, 46B, and 46C, a band pass filter 47, and controllers 48A, 48B, and 48C.

The polarization beam splitter/combiner 41 separates input signal light into two polarized wave components orthogonal to each other and outputs a horizontal polarized wave component of the separated input signal light to the optical splitter 44A and outputs a vertical polarized wave component to the polarization controller 42A.

The polarization controller 42A controls the vertical polarized wave component of the input signal light output from the polarization beam splitter/combiner 41 to be a horizontal polarized wave and outputs the vertical polarized wave component (the horizontal polarized wave) of the input signal light after the conversion to the optical splitter 44B.

The control light generator 50 outputs first continuous oscillation light having a frequency $v_1$ and second continuous oscillation light having a frequency $v_2$ ($|v_1-v_2|=\Delta v$) to the polarization controller 42B. That is, the control light generator 50 outputs first control light obtained by multiplexing the first continuous oscillation light and the second continuous oscillation light to the polarization controller 42B. Polarized waves of the first continuous oscillation light and the second continuous oscillation light are orthogonal to each other. The control light generator 50 outputs third continuous oscillation light having a frequency $v_3$ and fourth continuous oscillation light having a frequency $v_4$ ($|v_3-v_4|=\Delta v$) to the polarization controller 42C. That is, the control light generator 50 outputs second control light obtained by multiplexing the third continuous oscillation light and the fourth continuous oscillation light to the polarization controller 42C. Polarized waves of the third continuous oscillation light and the fourth continuous oscillation light are orthogonal to each other. The frequencies of the first to fourth continuous oscillation lights are outside a transmission band.

The polarization controller 42B controls the polarized wave of the first continuous oscillation light output from the control light generator 50 to be a horizontal polarized wave and outputs the obtained first continuous oscillation light (horizontal polarized wave) to the optical multiplexer 43A. The polarization controller 42B controls the polarized wave of the second continuous oscillation light output from the control light generator 50 to be a vertical polarized wave and outputs the obtained second continuous oscillation light (vertical polarized wave) to the optical multiplexer 43A.

The polarization controller 42C controls the polarized wave of the third continuous oscillation light output from the control light generator 50 to be a horizontal polarized wave and outputs the obtained third continuous oscillation light (horizontal polarized wave) to the optical multiplexer 43B. The polarization controller 42C controls the polarized wave of the fourth continuous oscillation light output from the control light generator 50 to be a vertical polarized wave and outputs the obtained fourth continuous oscillation light (vertical polarized wave) to the optical multiplexer 43B.

The optical multiplexer 43A multiplexes the first continuous oscillation light and the second continuous oscillation light output from the polarization controller 42B and the horizontal polarized wave component of the signal light, which is the horizontal polarized wave, output from the optical splitter 44A and outputs multiplexed light of the first continuous oscillation light, the second continuous oscillation light, and the horizontal polarized wave component of the signal light to the nonlinear optical medium 6C.

The optical multiplexer 43B multiplexes the third continuous oscillation light and the fourth continuous oscillation light output from the polarization controller 42C and the vertical polarized wave component of the signal light, which is the horizontal polarized wave, output from the optical splitter 44B and outputs multiplexed light of the third continuous oscillation light, the fourth continuous oscillation light, and the vertical polarized wave component of the signal light to the nonlinear optical medium 6C.

In the nonlinear optical medium 6C, a nonlinear optical effect is caused by the input of the horizontal polarized wave component of the signal light, the first continuous oscillation light, and the second continuous oscillation light output from the optical multiplexer 43A. First idler light, which is a vertical polarized wave, having a frequency $v_0+\Delta v$ is generated. A data modulation component of the first idler light is equal to a data modulation component of the horizontal polarized wave component of the input signal light. The first idler light is output to the optical multiplexer 43B.

In the nonlinear optical medium 6C, a nonlinear optical effect is caused by the input of the vertical polarized wave component of the signal light, the third continuous oscillation light, and the fourth continuous oscillation light output from the optical multiplexer 43B. Second idler light, which is a vertical polarized wave, having a frequency $v_0+\Delta v$ is generated. As explained above, the vertical polarized wave component of the input signal light input to the nonlinear optical medium 6C is controlled to be the horizontal polarized wave by the polarization controller 42A in advance. A data modulation component of the second idler light is equal to a data modulation component of the vertical polarized wave component of the input signal light. The second idler light is output to the optical multiplexer 43A.

The optical splitter 44A divides light including the second idler light output from the nonlinear optical medium 6C and outputs one of divided lights to the polarization beam splitter/combiner 41 and outputs the other to the polarizer 45A. At this time, the divided light output to the polarizer 45A is the second idler light.

The polarizer 45A is a polarizer that transmits a signal of a vertical polarized wave and does not transmit a signal of a horizontal polarized wave. Therefore, the polarizer 45A blocks transmission of the input signal light of the horizontal polarized wave in the light output from the nonlinear optical medium 6C and outputs the second idler light of the vertical polarized wave to the photodetector 46A.

The photodetector 46A detects the second idler light output from the nonlinear optical medium 6C, converts the second idler light into an electric signal, and outputs the electric signal to the controller 48B and the band pass filter 47.

The controller 48B controls the polarization controller 42C to maximize the intensity of the electric signal output from the photodetector 46A.

The optical splitter 44B divides light including the first idler light output from the nonlinear optical medium 6C and outputs one of divided lights to the polarization controller 42A and outputs the other to the polarizer 45B. At this time, the divided light output to the polarizer 45B is the first idler light.

The polarizer 45B is a polarizer that transmits a signal of a vertical polarized wave and does not transmit a signal of a horizontal polarized wave. Therefore, the polarizer 45B blocks transmission of the input signal light of the horizontal polarized wave in the light output from the nonlinear optical medium 6C and outputs the first idler light of the vertical polarized wave to the photodetector 46B.

The photodetector 46B detects the first idler light output from the nonlinear optical medium 6C, converts the first idler light into an electric signal, and outputs the electric signal to the controller 48A and the band pass filter 47.

The controller 48A controls the polarization controller 42B to maximize the intensity of the electric signal output from the photodetector 46B.

The polarization controller 42A controls the first idler light of the vertical polarized wave output from the optical splitter 44B to be a horizontal polarized wave and outputs the first idler light of the horizontal polarized wave after the conversion to the polarization beam splitter/combiner 41.

The polarization beam splitter/combiner 41 multiplexes the second idler light of the vertical polarized wave output from the optical splitter 44A and the first idler light of the horizontal polarized wave output from the polarization controller 42A and outputs multiplexed light to an optical splitter 44C.

The optical splitter 44C divides the multiplexed signal of the first and second idler lights output from the polarization beam splitter/combiner 41 and outputs one of divided optical signals (multiplexed signals) to the photodetector 46C and outputs the other to the output signal light port. At this time, the optical signal output to the photodetector 46C is the optical signal input to the optical splitter 44C.

The photodetector 46C detects the optical signal output from the optical splitter 44C, converts the optical signal into an electric signal, and outputs the electric signal to the controllers 48A, 48B, and 48C and the band pass filter 47.

The controller 48A controls the polarization controller 42B to maximize the intensity of the electric signal output from the photodetector 46C.

The controller 48B controls the polarization controller 42C to maximize the intensity of the electric signal output from the photodetector 46C.

The controller 48C controls the polarization controller 42A to maximize the intensity of the electric signal output from the photodetector 46C.

The band pass filter 47 transmits an electric signal in a part of signal bands of the electric signals output from the photodetectors 46A, 46B, and 46C and outputs the electric signal to the control light generator 50.

The control light generator 50 includes a light source that outputs the first to fourth continuous oscillation lights and a circuit and a device for aligning timings of phase modulation of the continuous oscillation lights. The control light generator 50 acquires the intensity of the electric signal output from the band pass filter 40 and aligns, based on the intensity of the electric signal, timings of phase modulation of the continuous oscillation lights.

In the wavelength converter 23 according to the third embodiment, the horizontal polarized wave component and the vertical polarized wave component of the signal light travel in opposite directions each other on the same optical transmission line and is wavelength-converted. Two idler lights obtained by the wavelength conversion are multiplexed and output. Consequently, a shift of phases of the horizontal polarized wave component and the vertical polarized wave component of the signal light due to a difference between the lengths of traveling paths of the horizontal polarized wave component and the vertical polarized wave component of the signal light does not have to be considered. An optical phase adjuster and a controller for controlling the optical phase adjuster are unnecessary. It is possible to further simplify components than the wavelength converter 22 according to the second embodiment. Since the operations of the optical phase adjuster and the controller for controlling the optical phase adjuster are unnecessary, power consumption is reduced. The wavelength converter 23 according to the third embodiment does not have to match the lengths of the optical transmission lines of the horizontal polarized wave component and the vertical polarized wave component of the signal light as in the second embodiment. The wavelength converter 23 may be more simply formed.

Fourth Embodiment

Figure 6:
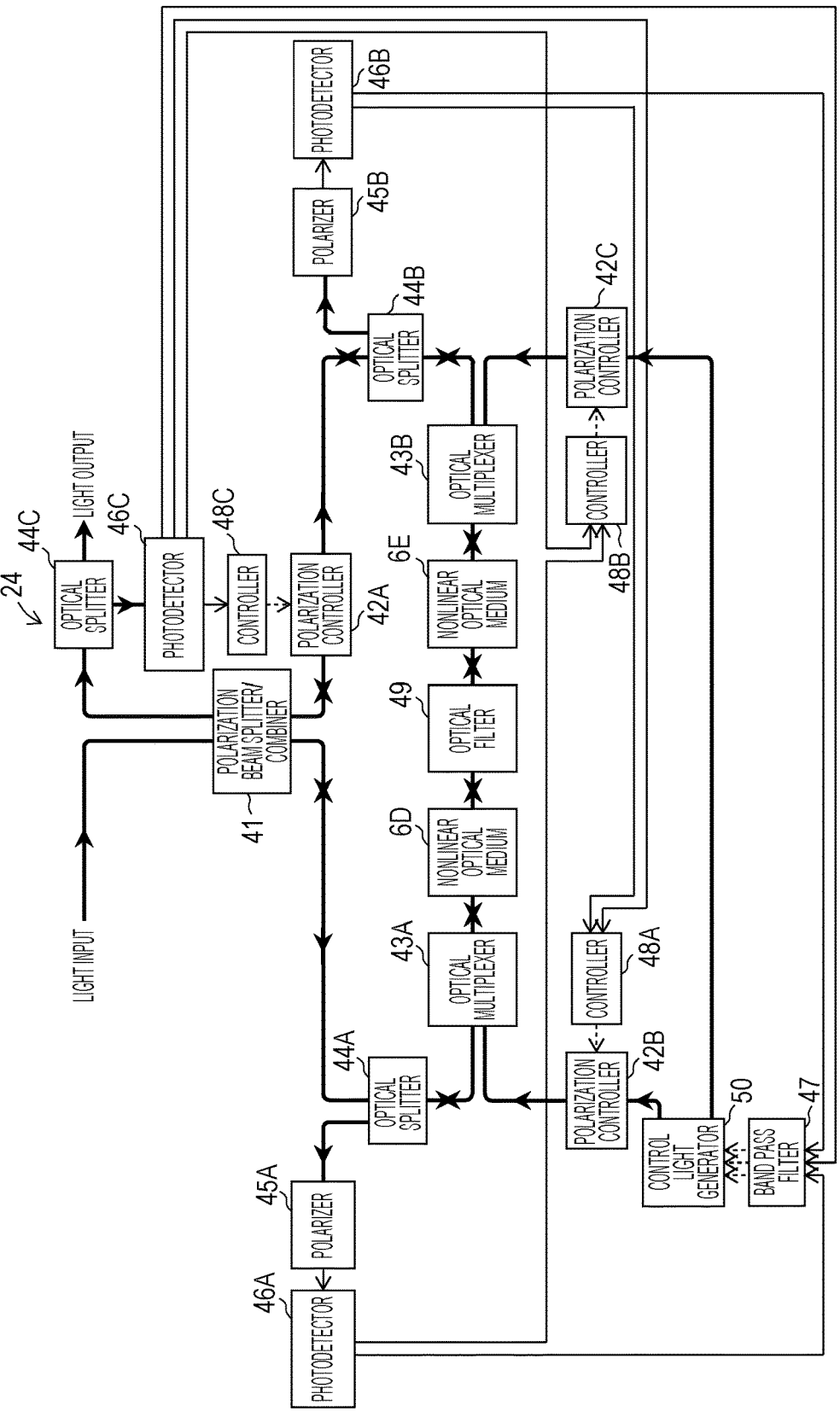
FIG. 6 is a diagram illustrating an example of a wavelength converter according to a fourth embodiment.

FIG. 6 illustrates an example of the wavelength converter 24 according to a fourth embodiment.

The wavelength converter 24 according to the fourth embodiment performs wavelength conversion of a WDM signal light without polarization dependency using two nonlinear optical media. The wavelength converter 24 according to the fourth embodiment includes nonlinear optical media 6D and 6E and an optical filter 49 instead of the nonlinear optical medium 6C in the wavelength converter 23 according to the third embodiment. The other parts of the wavelength converter 24 is the same as the parts in the wavelength converter 23 according to the third embodiment. Explanation is omitted concerning the same parts. The same devices are denoted by the same reference numerals and signs in the drawings.

In an optical fiber having linearity, two optical signals traveling in opposite directions each other do not interfere with each other. Therefore, the two polarized wave components of the signal light propagating in the optical fiber of the wavelength converter 23 according to the third embodiment do not interfere with each other. However, the two polarized wave components are likely to interfere with each other in the nonlinear optical medium 6C. Consequently, noise is likely to occur. The wavelength converter 24 according to an example of the fourth embodiment reduces interference of signal light in a nonlinear optical medium and performs wavelength conversion having higher conversion efficiency.

First, a horizontal polarized wave component of signal light, which is a horizontal polarized wave, first continuous oscillation light, and second continuous oscillation light output from the optical multiplexer 43A are input to the nonlinear optical medium 6D. Consequently, a nonlinear optical effect occurs. First idler light, which is a vertical polarized wave, is generated at a frequency $v_0+\Delta v$. As in the third embodiment, the first idler light has a modulation component of an electric field equal to a data modulation component of the horizontal polarized wave component of the input signal light. The first idler light is output to the optical filter 49.

A vertical polarized wave component of signal light, which is a horizontal polarized wave, third continuous oscillation light, and fourth continuous oscillation light output from the optical multiplexer 43B are input to the nonlinear optical medium 6E. Consequently, a nonlinear optical effect occurs. Second idler light, which is a vertical polarized wave, is generated at a frequency $v_0+\Delta v$. As in the third embodiment, the second idler light has a modulation component of an electric field equal to a data modulation component of the vertical polarized wave component of the input signal light. The second idler light is output to the optical filter 49.

The optical filter 49 transmits light having a frequency in a transmission band. Therefore, the optical filter 49 blocks transmission of the first to fourth continuous oscillation lights and the like having frequencies outside the transmission band.

The first idler light transmitted through the optical filter 49 is output to the nonlinear optical medium 6E. Similarly, the second idler light transmitted through the optical filter 49 is output to the nonlinear optical medium 6D.

As explained above, when light having large intensity is input to a nonlinear optical medium, a nonlinear optical effect, induced Brillouin scattering, and the like occur. However, the intensity of idler light is so small as to not cause these effects. Therefore, the first idler light input to the nonlinear optical medium 6E is directly output to the optical multiplexer 43B. The second idler light input to the nonlinear optical medium 6D is directly output to the optical multiplexer 43A.

The other operations of the wavelength converter 24 according to the fourth embodiment are equal to the operations of the wavelength converter 23 according to the third embodiment explained above. Therefore, explanation of the operations is omitted.

As explained above, it is possible to realize wavelength conversion having conversion efficiency equal to or higher than the conversion efficiency in the third embodiment by performing, using the two nonlinear optical media 6D and 6E separated by the optical filter 49, wavelength conversion of polarized wave components of input signal light in the nonlinear optical media.

Control light generators according to a plurality of embodiments that perform phase modulation with aligned timings on two or more continuous oscillation lights and output two control lights are explained below. Control light generators 51, 52, 53, 54, 55, and 56 according to the embodiments may be used as the control light generator 50 in the wavelength converters 22, 23, and 24 according to the embodiments explained above.

Fifth Embodiment

Figure 7:
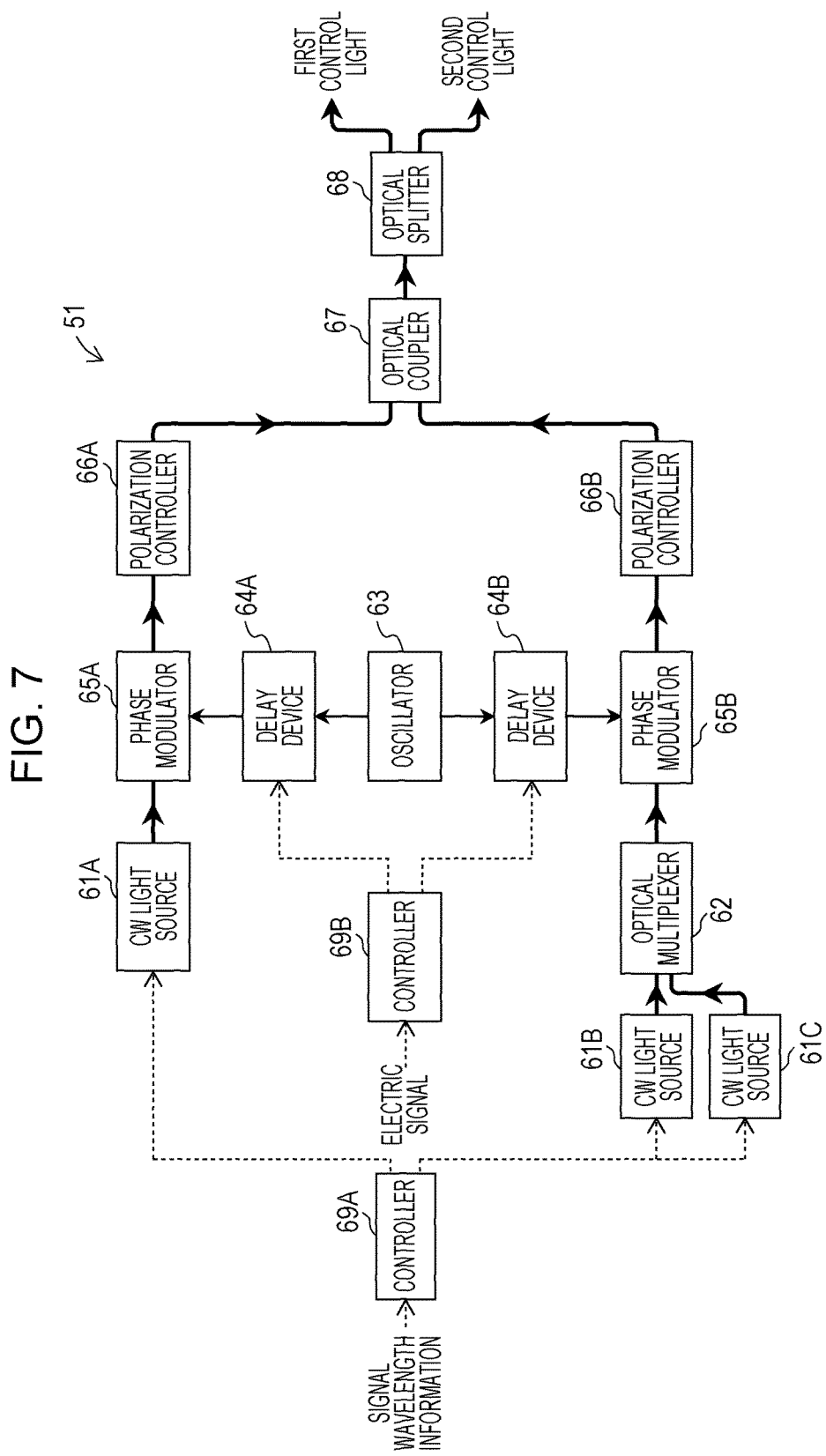
FIG. 7 is a diagram illustrating an example of a control light generator according to a fifth embodiment.

FIG. 7 illustrates an example of the control light generator 51 according to a fifth embodiment. The control light generator 51 outputs two control lights. Each of the two control lights output from the control light generator 51 according to the fifth embodiment is control light obtained by multiplexing two continuous oscillation lights. Each of the control lights output from the control light generator 51 is control light obtained by multiplexing first continuous oscillation light and second continuous oscillation light, the frequencies of which are $v_1$ and $v_2$ ($v_2=v_1\pm\Delta v$). In this case, the control light generator 50 in the second to fourth embodiments may be realized by the control light generator 51. For example, in the third embodiment, the control light obtained by multiplexing the first and second continuous oscillation lights and the control light obtained by multiplexing the third and fourth continuous oscillation lights are output from the control light generator 50. The third continuous oscillation light and the fourth continuous oscillation light in the third embodiment respectively correspond to the first continuous oscillation light and the second continuous oscillation light in the fifth embodiment. However, the correspondence of the continuous oscillation lights is not limited to this.

Note that, when the control lights output from the control light generator 51 are not the control lights obtained by multiplexing the two continuous oscillation lights and are the first continuous oscillation light and the second continuous oscillation light, the control light generator 51 may realize the function of the control light generator 5 according to the first embodiment. The same applies to the control light generators 52, 53, 54, 55, and 56 according to the sixth to tenth embodiments explained below.

Instead of such a case, each of the two control lights output from the control light generator 51 may be control light obtained by multiplexing first continuous oscillation light and second' continuous oscillation light, the frequencies of which are $v_1$ and $v_{2'}$ ($v_{2'}=v_1\pm2(v_1-v_0)-\Delta v$). Note that $v_0$ is the frequency of input signal light and $v_1$, $v_2$, $v_{2'}$ are frequencies outside a transmission band. The same applies to the control light generators 52 to 56 according to the sixth to tenth embodiments explained below.

The control light generator 51 according to the fifth embodiment includes, as illustrated in FIG. 7, CW light sources (light sources of continuous oscillation lights) 61A, 61B, and 61C, an optical multiplexer 62, an oscillator 63, delay devices 64A and 64B, and phase modulators 65A and 65B. The control light generator 51 includes polarization controllers 66A and 66B, an optical coupler 67, an optical splitter 68, and controllers 69A and 69B.

The operations of the devices included in the control light generator 51 are explained below. The CW light source 61A outputs the first continuous oscillation light to the phase modulator 65A.

The CW light source 61B outputs the second continuous oscillation light to the optical multiplexer 62.

The CW light source 61C outputs the second' continuous oscillation light to the optical multiplexer 62.

In the fifth embodiment, the control light generator 51 includes the CW light source 61B and the CW light source 61C. However, when continuous oscillation lights in both frequency bands of $v_2$ and $v_{2'}$ may be output by a single light source, the CW light source 61B and the CW light source 61C may be collected as one light source. In the control light generator 51 according to the fifth embodiment includes the CW light source 61B and the CW light source 61C. However, the control light generator 51 may include either one of the CW light source 61B and the CW light source 61C. The CW light sources 61A, 61B, and 61C are, for example, laser light sources. The same applies to the control light generators 52, 53, and 54 according to the sixth to eighth embodiments explained below.

The optical multiplexer 62 outputs either one of the second continuous oscillation light and the second' continuous oscillation light to the phase modulator 65B. Which of the second and second' continuous oscillation lights is output from the optical multiplexer 62 is determined according to whether desired output signal light is conjugate signal light. That is, according to the illustration referring to FIGS. 3A and 3B, when the output signal light, the electric field of which is represented by Expressions (4) and (6) described above, is desired, the optical multiplexer 62 outputs the second continuous oscillation light. On the other hand, when the output signal light, the electric field of which is represented by Expressions (9) and (12) described above, is desired, the optical multiplexer 62 outputs the second' continuous oscillation light. An instruction to the optical multiplexer 62 concerning which of the second and second' continuous oscillation lights is output is determined by a not-illustrated instructing device. The instruction concerning which of the second and second' continuous oscillation lights is output may be given to the CW light sources 61B and 61C by the not-illustrated instructing device. The same applies to the control light generators 52, 53, and 54 according to the sixth to eighth embodiments explained below.

The phase modulator 65A phase-modulates the first continuous oscillation light with an output signal from the oscillator 63 and outputs the phase-modulated first continuous oscillation light to the polarization controller 66A. Note that the output signal from the oscillator 63 is adjusted as appropriate by the delay device 64A. The delay device 64A is explained below.

The phase modulator 65B phase-modulates the second continuous oscillation light or the second' continuous oscillation light with the output signal from the oscillator 63. The phase modulator 65B outputs the continuous oscillation light after the phase modulation to the polarization controller 66B. Note that the output signal from the oscillator 63 is adjusted as appropriate by the delay device 64B. The delay device 64B is explained below.

The polarization controller 66A controls a polarized wave of the input first continuous oscillation light to be a horizontal polarized wave and outputs the first continuous oscillation light after the conversion to the optical coupler 67.

The polarization controller 66B controls a polarized wave of the input second or second' continuous oscillation light to be a vertical polarized wave and outputs the continuous oscillation light after the conversion to the optical coupler 67.

The optical coupler 67 multiplexes the first continuous oscillation light of the horizontal polarized wave output from the polarization controller 66A and the second continuous oscillation light or the second' continuous oscillation light of the vertical polarized wave output from the polarization controller 66B and outputs multiplexed light of the first continuous oscillation light and the second continuous oscillation light or the second continuous oscillation light to the optical splitter 68. A polarization beam splitter and a wavelength-selective switch may be disposed instead of or together with the optical coupler 67.

The optical splitter 68 divides the first continuous oscillation light and the second continuous oscillation light or the second' continuous oscillation light output from the optical coupler 67 and outputs the first continuous oscillation light and the second continuous oscillation light or the second' continuous oscillation light as first control light and second control light. The same applies to the control light generators 52, 53, 54, and 55 according to the sixth to ninth embodiments. In the following explanation, in a control light generator, a portion that outputs control light is also referred to as control-light output unit. In fifth embodiment and the sixth to ninth embodiments explained below, the control-light output unit corresponds to the optical splitter 68.

Note that the first continuous oscillation light and the second continuous oscillation light in the first control light in the fifth embodiment may be respectively caused to correspond to the first continuous oscillation light and the second continuous oscillation light in the second to fourth embodiments. The first continuous oscillation light and the second continuous oscillation light in the second control light in the fifth embodiment may be respectively caused to correspond to the fourth continuous oscillation light and the third continuous oscillation light in the second embodiment and the third continuous oscillation light and the fourth continuous oscillation light in the third and fourth embodiments. However, the correspondence of the continuous oscillation lights is not limited to this. The same applies to the sixth to ninth embodiments.

The controller 69A acquires signal wavelength information from a not-illustrated circuit. The signal wavelength information indicates information concerning the frequency of input signal light (signal light before wavelength conversion) and the frequency of output signal light (signal light after the wavelength conversion). The controller 69A controls, based on the signal wavelength information, the frequencies of the continuous oscillation lights output from the CW light sources 61A, 61B, and 61C.

The controller 69B calculates the intensity of the signal light after the wavelength conversion. More specifically, in the case of the wavelength converters 21, 22, 23, and 24 according to the first to fourth embodiments, the controller 69B calculates, based on electric signal intensity (feedback) from the band pass filters 10, 40, and 47, the intensity of the output signal light. The controller 69B calculates delay amounts of phases (phase delay amounts) of the continuous oscillation lights for maximizing the electric signal intensity. The electric signal intensity is proportional to the intensity of the output signal light. Therefore, the controller 69B calculates a phase delay amount of the first continuous oscillation light (also referred to as first phase delay amount) and a phase delay amount of the second continuous oscillation light or the second' continuous oscillation light (also referred to as second phase delay amount) for maximizing the intensity of the output signal light. At this time, the phase delay amounts are values at which timing of phase modulation of the first continuous oscillation light and timing of phase modulation of the second continuous oscillation light or the second' continuous oscillation light coincide.

The controller 69B controls the delay device 64A such that the phase modulator 65A performs the phase modulation of the first continuous oscillation light using the first phase delay amount. Similarly, the controller 69B controls the delay device 64B such that the phase modulator 65B performs the phase modulation of either one of the second and second' continuous oscillation lights using the second phase delay amount. The output signal from the oscillator 63 is adjusted by the delay devices 64A and 64B respectively based on the first phase delay amount and the second phase delay amount. The output signal adjusted by the delay device 64A is output to the phase modulator 65A. The first continuous oscillation light is phase-modulated based on the signal. Similarly, the output signal adjusted by the delay device 64B is output to the phase modulator 65B. Either one of the second and second' continuous oscillation lights is phase-modulated based on the signal. In the following explanation, a portion that controls a phase state is referred to as a phase controller. In the fifth embodiment, the controller 69B corresponds to the phase controller.

The control light generator 51 according to the fifth embodiment receives the feedback of the intensity of the signal light after the wavelength conversion and performs, based on control from the controller 69B, phase modulation with aligned timings on the continuous oscillation lights. Consequently, it is possible to reduce a noise component of the output signal light and perform wavelength conversion at higher conversion efficiency.

Sixth Embodiment

Figure 8:
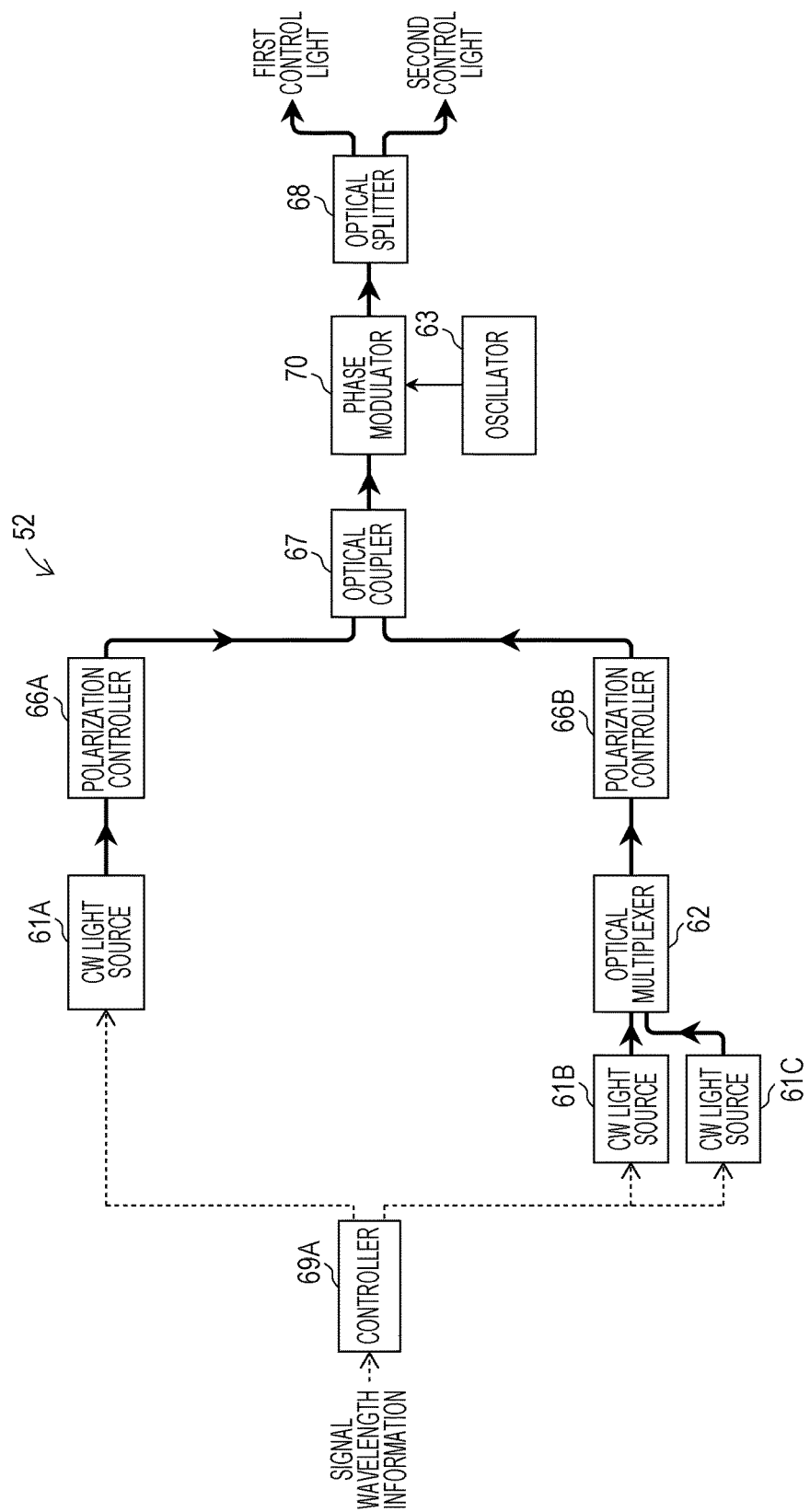
FIG. 8 is a diagram illustrating an example of a control light generator according to a sixth embodiment.

FIG. 8 illustrates an example of the control light generator 52 according to a sixth embodiment. The control light generator 52 according to the sixth embodiment includes, as illustrated in FIG. 8, the CW light sources 61A, 61B, and 61C, the optical multiplexer 62, the oscillator 63, a phase modulator 70, the polarization controllers 66A and 66B, and the optical coupler 67. The control light generator 52 includes the optical splitter 68 and the controller 69A. Note that devices that perform the same processing as the processing of the devices in the control light generator 51 according to the fifth embodiment are denoted by the same reference numerals and signs as the reference numerals and signs of the devices explained above. Note that, even if devices are denoted by the same reference numerals and signs, input and output destinations of the devices are sometimes different depending on a connection state of the devices.

The CW light source 61A outputs the first continuous oscillation light to the polarization controller 66A.

The CW light source 61B outputs the second continuous oscillation light to the optical multiplexer 62.

The CW light source 61C outputs the second' continuous oscillation light to the optical multiplexer 62.

The optical multiplexer 62 outputs either one of the second continuous oscillation light and the second' continuous oscillation light to the polarization controller 66B.

The polarization controller 66A controls a polarized wave of the first continuous oscillation light output from the CW light source 61A to be a horizontal polarized wave and outputs the first continuous oscillation light of the horizontal polarized wave after the control to the optical coupler 67.

The polarization controller 66B controls a polarized wave of the second continuous oscillation light or the second' continuous oscillation light output from the CW light source 61B to be a vertical polarized wave and outputs either one of the second and second' continuous oscillation lights of the vertical polarized wave after the control to the optical coupler 67.

The optical coupler 67 multiplexes the first continuous oscillation light, which is the horizontal polarized wave, output from the polarization controller 66A and the second continuous oscillation light or the second' continuous oscillation light, which is the vertical polarized wave, output from the polarization controller 66B and outputs multiplexed light of the first continuous oscillation light and the second continuous oscillation light or the second' continuous oscillation light to the phase modulator 70. A polarization beam splitter and a wavelength-selective switch may be provided instead of or together with the optical coupler 67.

The phase modulator 70 does not have polarization dependency. The phase modulator 70 phase-modulates the first continuous oscillation light and the second continuous oscillation light or the second' continuous oscillation light with the output signal from the oscillator 63 and outputs the phase-modulated continuous oscillation lights to the optical splitter 68. In the phase modulation, the first continuous oscillation light and the second continuous oscillation light or the second' continuous oscillation light are phase-adjusted with timings aligned with each other. In the sixth embodiment, the phase modulator 70 corresponds to the phase controller.

The optical splitter 68 devices the first continuous oscillation light and the second continuous oscillation light or the second' continuous oscillation light output from the phase modulator 70 and outputs the first continuous oscillation light and the second continuous oscillation light or the second' continuous oscillation light as first control light and second control light.

The controller 69A controls, based on information concerning the frequencies of signal light before and after wavelength conversion, the frequencies of the continuous oscillation lights output from the CW light sources 61A, 61B, and 61C.

According to the sixth embodiment, the phase modulator 70 performs the phase modulation with aligned timings on the two continuous oscillation lights. Therefore, a device for feedback such as a delay device is unnecessary. Therefore, it is possible to easily manufacture the control light generator 52.

Seventh Embodiment

Figure 9:
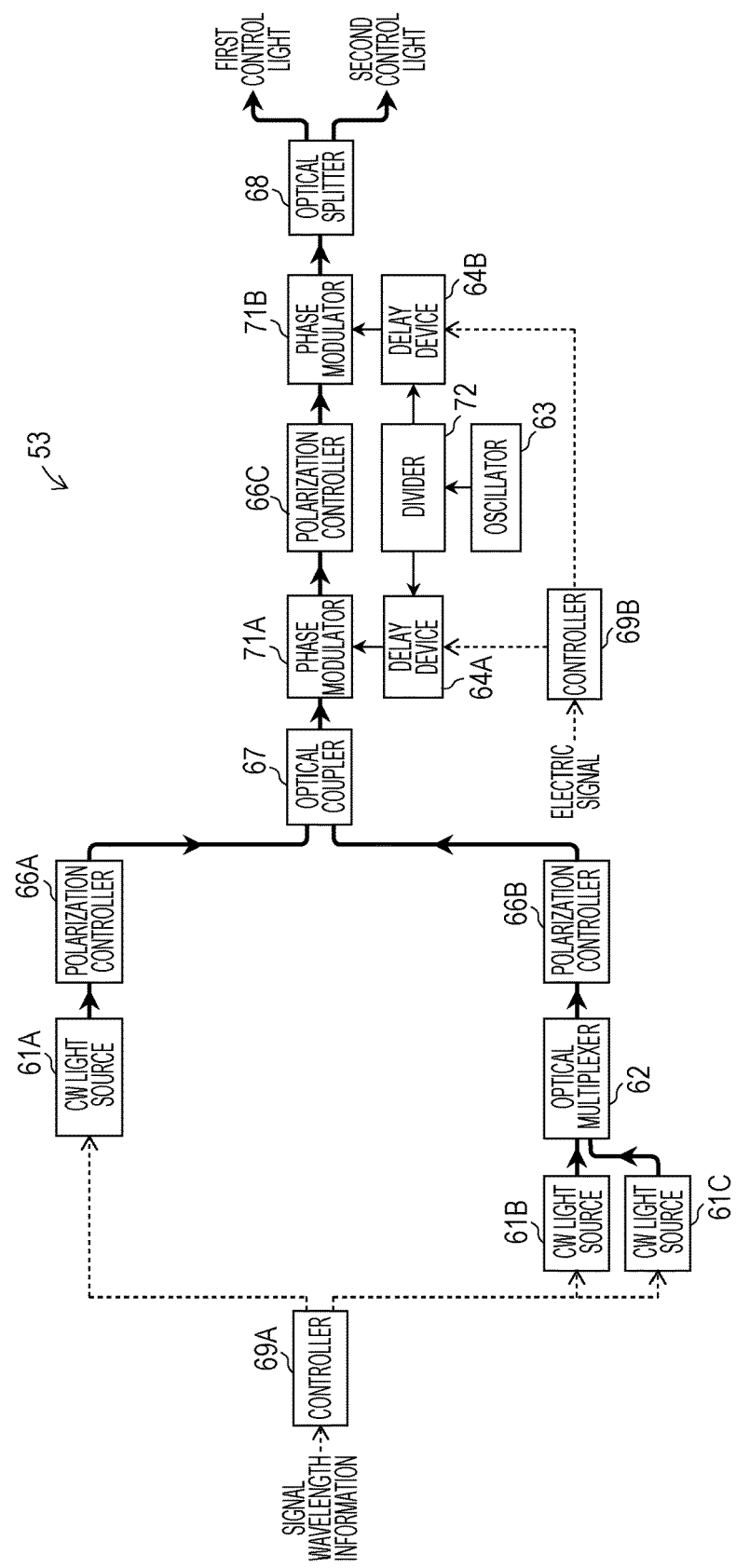
FIG. 9 is a diagram illustrating an example of a control light generator according to a seventh embodiment.

FIG. 9 illustrates an example of the control light generator 53 according to a seventh embodiment. The control light generator 53 according to the seventh embodiment includes, as illustrated in FIG. 9, the CW light sources 61A, 61B, and 61C, the optical multiplexer 62, the polarization controllers 66A, 66B, and 66C, and the optical coupler 67. The control light generator 53 includes the oscillator 63, the delay devices 64A and 64B, phase modulators 71A and 71B, a divider 72, the optical splitter 68, and the controllers 69A and 69B. Devices in the control light generator 53 according to the seventh embodiment that perform the same processing as the processing of the devices in the control light generators 51 and 52 according to the fifth and sixth embodiments are denoted by the same reference numerals and signs as the reference numerals and signs of the devices explained above. Note that, even if devices are denoted by the same reference numerals and signs, input and output destinations of the devices are sometimes different depending on a connection state of the devices.

The CW light source 61A outputs the first continuous oscillation light to the polarization controller 66A.

The CW light source 61B outputs the second continuous oscillation light to the optical multiplexer 62.

The CW light source 61C outputs the second' continuous oscillation light to the optical multiplexer 62.

The optical multiplexer 62 outputs either one of the second continuous oscillation light and the second' continuous oscillation light to the polarization controller 66B.

The polarization controller 66A controls a polarized wave of the first continuous oscillation light output from the CW light source 61A to be a horizontal polarized wave and outputs the first continuous oscillation light of the horizontal polarized wave after the control to the optical coupler 67.

The polarization controller 66B controls a polarized wave of the second continuous oscillation light or the second' continuous oscillation light output from the CW light source 61B to be a vertical polarized wave and outputs either one of the second and second' continuous oscillation lights of the vertical polarized wave after the control to the optical coupler 67.

The optical coupler 67 multiplexes the first continuous oscillation light, which is the horizontal polarized wave, output from the polarization controller 66A and the second continuous oscillation light or the second' continuous oscillation light, which is the vertical polarized wave, output from the polarization controller 66B and outputs multiplexed light of the first continuous oscillation light and the second continuous oscillation light or the second' continuous oscillation light to the phase modulator 71A. A polarization beam splitter and a wavelength-selective switch may be provided instead of or together with the optical coupler 67.

The phase modulator 71A performs phase modulation on the horizontal polarized wave at high modulation efficiency. Therefore, the phase modulator 71A performs the phase modulation on the first continuous oscillation light at high modulation efficiency. The phase modulator 71A phase-modulates the first continuous oscillation light using an output signal from the oscillator 63 divided by the divider 72. The phase modulator 71A outputs the first continuous oscillation signal after the phase modulation to the polarization controller 66C.

The polarization controller 66C controls a polarization state of the second continuous oscillation light or the second' continuous oscillation light such that the second continuous oscillation light or the second' continuous oscillation light is phase-modulated at high modulation efficiency in the phase modulator 71B. The phase modulator 71B explained below has high modulation efficiency with respect to the vertical polarized wave. Therefore, the polarization controller 66C adjusts a shift from the vertical direction of a polarization direction of the second continuous oscillation light or the second' continuous oscillation light that occurs after the polarization control by the polarization controller 66B.

The phase modulator 71B phase-modulates the second continuous oscillation light or the second' continuous oscillation light with the output signal from the oscillator 63 divided by the divider 72 and outputs either one of the second and second' continuous oscillation lights after the phase modulation to the optical splitter 68.

The optical splitter 68 divides the first continuous oscillation light and the second continuous oscillation light or the second' continuous oscillation light output from the phase modulator 71B and outputs the first continuous oscillation light and the second continuous oscillation light or the second' continuous oscillation light as first control light and second control light.

As in the case of the control light generators 51 and 52 according to the fifth and sixth embodiments, the controller 69A controls, based on information concerning the frequencies of signal light before and after wavelength conversion, the frequencies of the continuous oscillation lights output from the CW light sources 61A, 61B, and 61C.

As in the case of the control light generators 51 and 52 according to the fifth and sixth embodiments, the controller 69B controls the delay devices 64A and 64B based on the intensity of the signal light after the wavelength conversion. In detail, the controller 69B calculates intensity of the output signal light from the intensity of the electric signal acquired by the feedback and calculates a first phase delay amount for maximizing the intensity of the output signal light. The controller 69B calculates a second phase delay amount for maximizing the intensity of the output signal light. The output signal from the oscillator 63 is divided by the divider 72. One of divided output signals is output to the delay device 64A and the other is output to the delay device 64B. The delay device 64A adjusts the output signal input from the divider 72 using the first phase delay amount according to an instruction from the controller 69B. The delay device 64B adjusts the output signal input from the divider 72 using the second phase delay amount according to an instruction from the controller 69B. The phase modulator 71A performs phase modulation of the first continuous oscillation light using the output signal adjusted in the delay device 64A. The phase modulator 71B performs phase modulation of the second continuous oscillation light using the output signal adjusted in the delay device 64B. Note that the first and second phase delay amounts are values at which timing of the phase modulation of the first continuous oscillation light and timing of the phase modulation of the second continuous oscillation light or the second' continuous oscillation light coincide.

In the seventh embodiment, the polarized waves of the first continuous oscillation light and the second continuous oscillation light or the second' continuous oscillation light are phase-modulated in the phase modulators 71A and 71B after being multiplexed by the photocoupler. Consequently, it is possible to avoid a shift of phases of the two continuous oscillation lights that occurs while the two continuous oscillation lights are propagated on an optical path. It is possible to avoid a shift of timings of phase modulation due to the shift of the phases. In the seventh embodiment, the continuous oscillation lights are controlled to be two polarized waves in directions orthogonal to each other by the polarization controllers 66A, 66B, and 66C. The continuous oscillation lights in the polarization state adjusted to the conversion efficiency of the phase modulators are phase-modulated with timings aligned with each other in the phase modulators using the phase delay amounts calculated by the feedback. Consequently, even if phase modulation is performed on one continuous oscillation light with a certain phase delay amount, the other continuous oscillation light is less easily affected by interference. A delay by the first phase delay amount is accurately reflected on the first continuous oscillation light. A delay by the second phase delay amount is accurately reflected on the second continuous oscillation light or the second' continuous oscillation light. Consequently, it is possible to accurately perform phase modulation with aligned timings on the two continuous oscillation lights.

Eighth Embodiment

Figure 10:
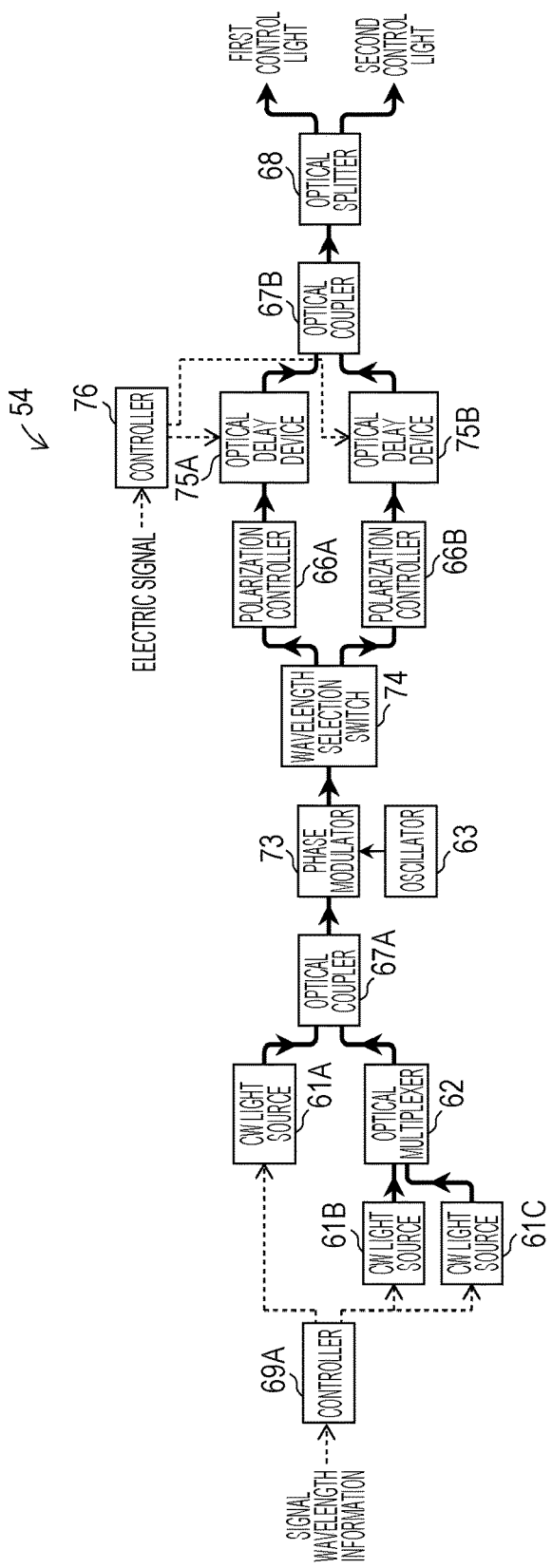
FIG. 10 is a diagram illustrating an example of a control light generator according to an eighth embodiment.

FIG. 10 illustrates an example of the control light generator 54 according to an eighth embodiment. The control light generator 54 according to the eighth embodiment includes, as illustrated in FIG. 10, the CW light sources 61A, 61B, and 61C, the optical multiplexer 62, optical couplers 67A and 67B, a phase modulator 73, the oscillator 63, and a wavelength-selective switch 74. The control light generator 54 includes the polarization controllers 66A and 66B, optical delay devices 75A and 75B, the optical splitter 68, and controllers 69A and 76. Note that, among the devices in the control light generator 54 according to the eighth embodiment, devices that perform the same processing as the processing of the devices in the control light generators 51, 52, and 53 according to the fifth to seventh embodiments are denoted by the same reference numerals and signs as the reference numerals and signs of the devices explained above. Note that, even if devices are denoted by the same reference numerals and signs, input and output destinations of the devices are sometimes different depending on a connection state of the devices.

The CW light source 61A outputs first continuous oscillation light to the optical coupler 67A.

The CW light source 61B outputs the second continuous oscillation light to the optical multiplexer 62.

The CW light source 61C outputs the second' continuous oscillation light to the optical multiplexer 62.

The optical multiplexer 62 outputs either one of the second continuous oscillation light and the second' continuous oscillation light to the optical coupler 67A.

The optical coupler 67A multiplexes the first continuous oscillation light and the second continuous oscillation light or the second' continuous oscillation light with polarization directions aligned. The optical coupler 67A outputs the multiplexed two continuous oscillation lights to the phase modulator 73. Note that the optical coupler 67A aligns the polarization directions of the two continuous oscillation lights such that phase modulation by the phase modulator 73 explained below is highly efficiently performed. The optical coupler 67A is also referred to as polarization conversion and multiplexing device.

The phase modulator 73 phase-modulates the first continuous oscillation light, the second continuous oscillation light, and the second continuous oscillation light using an output signal from the oscillator 63. Subsequently, the phase modulator 73 outputs a multiplexed wave of the phase-modulated two continuous oscillation lights to the wavelength-selective switch 74. Note that the phase modulator 73 has high modulation efficiency with respect to the continuous oscillation lights in the polarization directions aligned by the optical coupler 67A.

The wavelength-selective switch 74 switches, based on wavelengths of an input plurality of continuous oscillation lights, output destinations of the continuous oscillation lights. The wavelength-selective switch 74 outputs, to the polarization controller 66A, the first continuous oscillation light in the multiplexed wave of the two continuous oscillation lights output from the phase modulator 73 and outputs the second continuous oscillation light or the second' continuous oscillation light to the polarization controller 66B.

The polarization controller 66A controls a polarized wave of the first continuous oscillation light output from the wavelength-selective switch 74 to be a horizontal polarized wave. The polarization controller 66A outputs the first continuous oscillation light of the horizontal polarized wave to the optical delay device 75A.

The polarization controller 66B controls the polarized wave of the second continuous oscillation light or the second' continuous oscillation light output from the wavelength-selective switch 74 to be a vertical polarized wave. The polarization controller 66B outputs the second continuous oscillation light or the second' continuous oscillation light of the vertical polarized wave to the optical delay device 75B.

The optical delay device 75A delays, based on an instruction of the controller 76 explained below, the first continuous oscillation light output from the polarization controller 66A. The optical delay device 75A outputs the delayed continuous oscillation light to the optical coupler 67B. The delay of the first continuous oscillation light is performed by, for example, changing the length of an optical transmission line in the optical delay device 75A. An amount of the change is calculated by the controller 76.

The optical delay device 75B delays, based on an instruction of the controller 76, the second continuous oscillation light or the second' continuous oscillation light output from the polarization controller 66B. The optical delay device 75B outputs the delayed continuous oscillation light to the optical coupler 67B.

The optical coupler 67B multiplexes the first continuous oscillation light and the second continuous oscillation light or the second' continuous oscillation light and outputs a multiplexed wave of the first continuous oscillation light and the second continuous oscillation light or the second' continuous oscillation light to the optical splitter 68. A polarization beam splitter and a wavelength-selective switch may be provided instead of or together with the optical coupler 67B.

The optical splitter 68 divides the first continuous oscillation light and the second continuous oscillation light or the second' continuous oscillation light output from the optical coupler 67B and outputs the first continuous oscillation light and the second continuous oscillation light or the second' continuous oscillation light as first control light and second control light.

The controller 69A controls, based on information concerning the frequencies of signal light before and after wavelength conversion, frequencies of the CW light sources 61A, 61B, and 61C.

The controller 76 calculates, based on the intensity of the signal light after the wavelength conversion, delay amounts (optical delay amounts) of the continuous oscillation lights. In detail, the controller 76 calculates, based on the intensity of the signal light after the wavelength conversion, a delay amount of the first continuous oscillation light (a first optical delay amount) and a delay amount of the second continuous oscillation light or the second' continuous oscillation light (a second optical delay amount). The first and second optical delay amounts correspond to delay of the continuous oscillation lights in the optical delay devices 75A and 75B in order to align timings of phase modulation of the two continuous oscillation lights. The controller 76 controls the optical delay device 75A to delay, based on the first optical delay amount and controls the optical delay device 75A to delay, based on the second optical delay amount, either one of the second and second' continuous oscillation lights. In the eighth embodiment, the controller 76 corresponds to the phase controller.

In the control light generator 54 according to the eighth embodiment, the optical coupler 67A aligns the first continuous oscillation light and the second continuous oscillation light or the second' continuous oscillation light with polarization directions aligned. The phase modulator 73 collectively and simultaneously phase-modulates the first continuous oscillation light and the second continuous oscillation light or the second' continuous oscillation light. Consequently, it is possible to perform phase modulation with aligned timings on the two continuous oscillation lights. The controller 76 corrects a shift of phases that occurs between the two continuous oscillation lights. According to the phase modulation with the aligned timings and the correction of the phases, it is possible to reduce noise of output signal light and perform wavelength conversion with high conversion efficiency.

Ninth Embodiment

Figure 11:
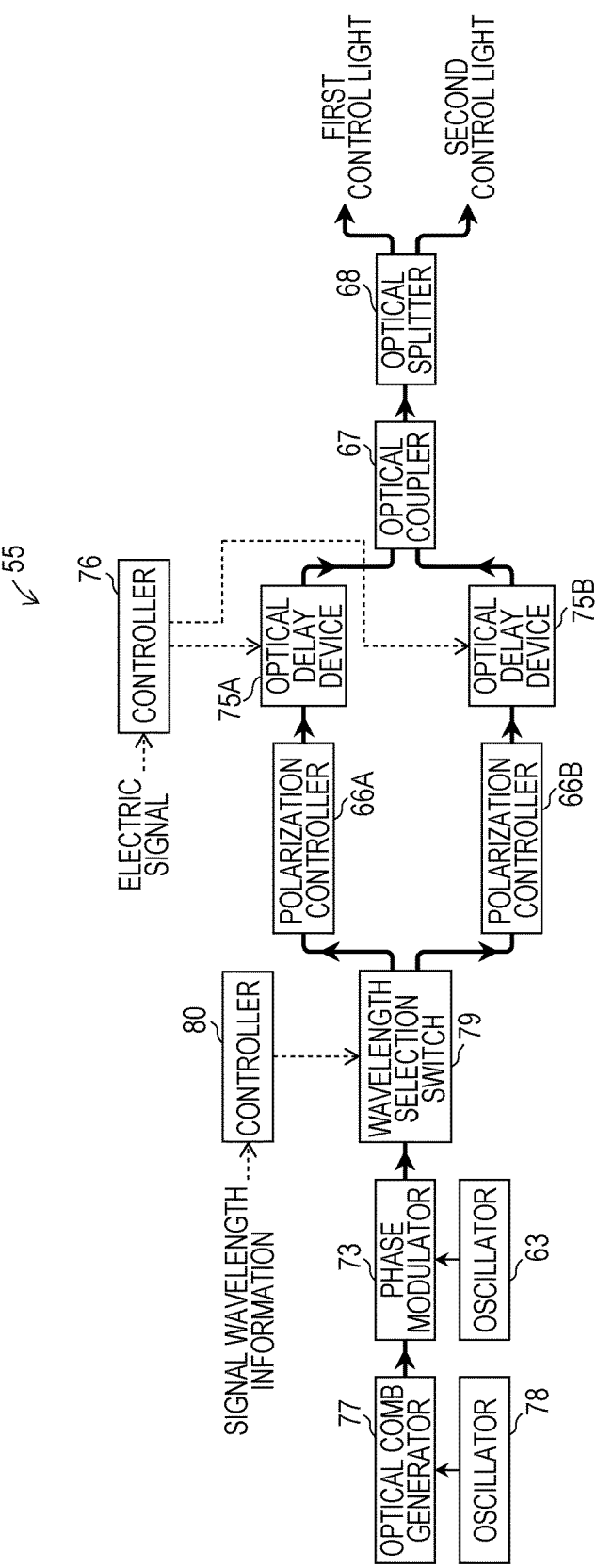
FIG. 11 is a diagram illustrating an example of a control light generator according to a ninth embodiment.

FIG. 11 illustrates an example of the control light generator 55 according to a ninth embodiment.

The control light generator 55 outputs two sets of two continuous oscillation lights, a difference between the frequencies of which is $\Delta v$. The control light generator according to the ninth embodiment may generate continuous oscillation light having high accuracy of a frequency by using an optical comb generator as a light source as explained below.

The control light generator 55 according to the ninth embodiment includes, as illustrated in FIG. 11, an optical comb generator 77, the phase modulator 73, an oscillator 78, the oscillator 63, a wavelength-selective switch 79, and the polarization controllers 66A and 66B. The control light generator 55 includes the optical delay devices 75A and 75B, the optical coupler 67, the optical splitter 68, and controllers 76 and 80. Note that, among the devices in the control light generator 55 according to the ninth embodiment, devices that perform the same processing as the processing of the devices in the control light generators 51, 52, 53, and 54 according to the fifth to eighth embodiments are denoted by the same reference numerals and signs as the reference numerals and signs of the devices explained above. Note that, even if devices are denoted by the same reference numerals and signs, input and output destinations of the devices are sometimes different depending on a connection state of the devices.

The optical comb generator 77 generates a plurality of continuous oscillation lights, a frequency interval among which is $f_0$, based on an output signal from the oscillator 78 and outputs the plurality of continuous oscillation lights to the phase modulator 73. Note that $f_0$ is a value decided by an output from the oscillator 78.

The phase modulator 73 has high modulation efficiency with respect to lights in polarization directions of the continuous oscillation lights output from the optical comb generator 77. The phase modulator 73 phase-modulates the continuous oscillation lights output from the optical comb generator 77 with an output signal of the oscillator 63 and outputs the phase-modulated continuous oscillation lights to the wavelength-selective switch 79.

The wavelength-selective switch 79 extracts, from the plurality of continuous oscillation lights, the frequency interval among which is $f_0$, a first continuous oscillation light having a frequency $v_1$ and a second continuous oscillation light having a frequency $v_2$ or a second' continuous oscillation light having a frequency $v_{2'}$, a difference between the frequencies of which is a desired value $\Delta v$. $\Delta v = |v_2 - v_1| = k \cdot f_0$ (k is an integer) holds. Besides, definitions of $v_0$, $v_1$, $v_2$, and $v_{2'}$ are the same as the definitions in the fifth to eighth embodiments. The wavelength-selective switch 79 outputs the first continuous oscillation light to the polarization controller 66A and outputs the second continuous oscillation light or the second' continuous oscillation light to the polarization controller 66B.

The polarization controller 66A controls a polarized wave of the first continuous oscillation light output from the wavelength-selective switch 79 to be a horizontal polarized wave and outputs the first continuous oscillation light after the control to the optical delay device 75A.

The polarization controller 66B controls a polarized wave of the second continuous oscillation light or the second' continuous polarization light output from the wavelength-selective switch 79 to be a vertical polarized wave and outputs the second continuous oscillation light or the second' continuous oscillation light after the control to the optical delay device 75B.

The optical delay device 75A delays, based on an instruction from the controller 76, the first continuous oscillation light output from the polarization controller 66A and outputs the delayed first continuous oscillation light to the optical coupler 67.

The optical delay device 75B delays, based on an instruction from the controller 76, the second continuous oscillation light or the second' continuous oscillation light output from the polarization controller 66B and outputs the delayed second continuous oscillation light or second' continuous oscillation light to the optical coupler 67.

The optical coupler 67 multiplexes the first continuous oscillation light output from the optical delay device 75A and the second continuous oscillation light or the second continuous oscillation light output from the optical delay device 75B. The optical coupler 67 outputs multiplexed continuous oscillation light to the optical splitter 68. A polarization beam splitter and a wavelength-selective switch may be provided instead of or together with the optical coupler 67.

The optical splitter 68 divides the first continuous oscillation light and the second continuous oscillation light or the second' continuous oscillation light output from the optical coupler 67 and outputs the first continuous oscillation light and the second continuous oscillation light or the second' continuous oscillation light as first control light and second control light.

The controller 76 calculates, based on the intensity of signal light after conversion, first and second optical delay amounts and controls, using the optical delay amounts, the optical delay devices 75A and 75B to delay the first continuous oscillation light and the second continuous oscillation light or the second' continuous oscillation light. In the ninth embodiment, the controller 76 corresponds to the phase controller.

The controller 80 calculates, based on information concerning the frequencies of signal light before and after wavelength conversion, a wavelength of light transmitted by the wavelength-selective switch 79 and controls the wavelength-selective switch 79 to transmit the light having the calculated wavelength.

According to the ninth embodiment, since the optical comb generator 77 is provided, accuracy of the frequencies of the continuous oscillation lights and accuracy of a difference between the frequencies of the two continuous oscillation lights are improved. The accuracy of the difference between the frequencies is decided by frequency accuracies of the first continuous oscillation light and the second continuous oscillation light. According to an example of the ninth embodiment, the accuracy of the difference between the frequencies may be set to approximately several kilohertz or less.

Consequently, it is possible to set the difference $\Delta v$ between the frequencies of the two continuous oscillation lights to a small value. Discretion of a value that may be taken as a shift amount from the frequency of input signal light to the frequency of an output signal is improved. Consequently, it is possible to realize wavelength conversion into any wavelength.

Tenth Embodiment

Figure 12:
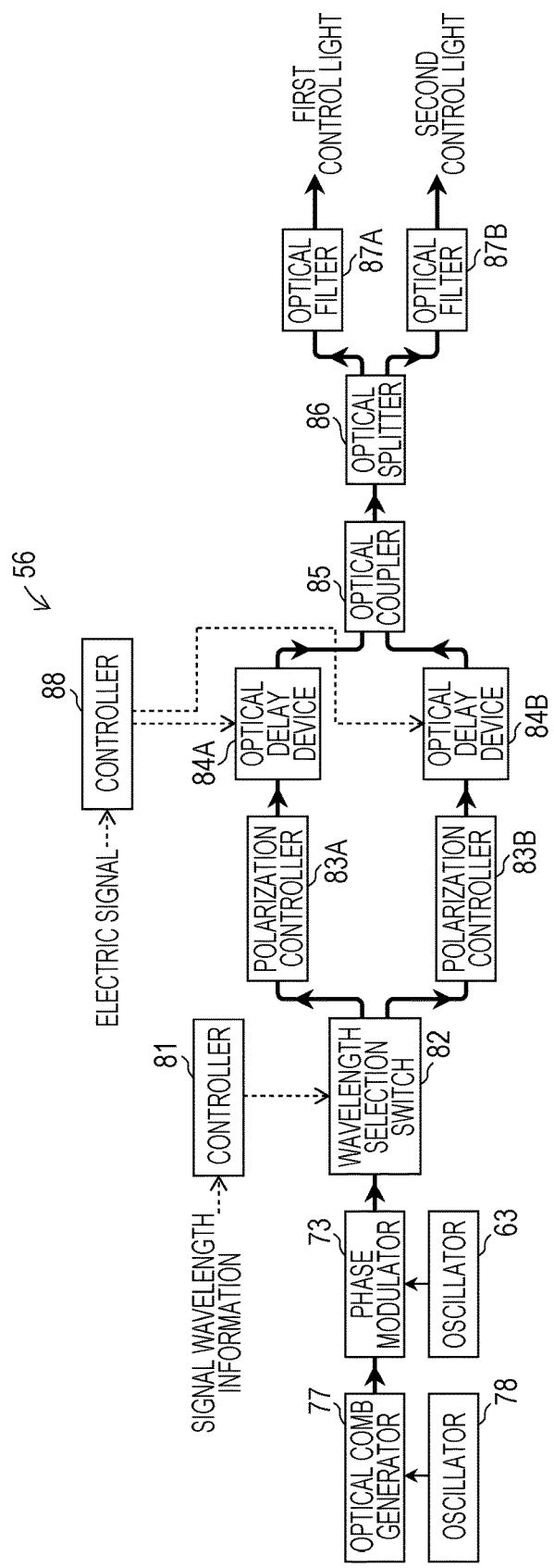
FIG. 12 is a diagram illustrating an example of a control light generator according to a tenth embodiment.

FIG. 12 illustrates an example of a control light generator according to a tenth embodiment. The control light generator 56 according to the tenth embodiment includes, as illustrated in FIG. 12, the optical comb generator 77, the phase modulator 73, the oscillators 63 and 78, a wavelength-selective switch 82, and polarization controllers 83A and 83B. The control light generator 56 includes optical delay devices 84A and 84B, an optical coupler 85, an optical splitter 86, optical filters 87A and 87B, and controllers 81 and 88. Note that, among the devices in the control light generator 56 according to the tenth embodiment, devices that perform the same processing as the processing of the devices in the control light generators 51, 52, 53, 54, and 55 according to the fifth to ninth embodiments are denoted by the same reference numerals and signs as the reference numerals and signs of the devices explained above. Note that, even if devices are denoted by the same reference numerals and signs, input and output destinations of the devices are sometimes different depending on a connection state of the devices.

The optical comb generator 77 outputs, based on an output signal from the oscillator 78, a plurality of continuous oscillation lights, a frequency interval among which is $f_0$, to the phase modulator 73.

The phase modulator 73 phase-modulates, based on an output signal from the oscillator 63, the continuous oscillation lights output from the optical comb generator 77 and outputs the continuous oscillation lights after the phase modulation to the wavelength-selective switch 82.

The wavelength-selective switch 82 extracts, from the plurality of continuous oscillation lights, the frequency interval among which is $f_0$, two sets of continuous oscillation lights, a difference between the frequencies of which is a desired value $\Delta v$. A set of first continuous oscillation light having a frequency $v_1$ and second continuous oscillation lights having a frequency $v_2$ and a set of third continuous oscillation light having a frequency $v_3$ and fourth continuous oscillation light having a frequency $v_4$ are extracted. Note that $\Delta v = |v_2 - v_1| = |v_4 - v_3| k \cdot f_0$ (k is an integer) holds.

The wavelength-selective switch 82 outputs the extracted first and third continuous oscillation lights to the polarization controller 83A and outputs the extracted second and fourth continuous oscillation lights to the polarization controller 83B.

The polarization controller 83A controls polarized waves of the first continuous oscillation light and the third continuous oscillation light output from the wavelength-selective switch 82 to be horizontal polarized waves and outputs the first and third continuous oscillation lights after the control to the optical delay device 84A.

The polarization controller 83B controls polarized waves of the second continuous oscillation light and the fourth continuous oscillation light output from the wavelength-selective switch 82 to be vertical polarized waves and outputs the second and fourth continuous oscillation lights after the control to the optical delay device 84B.

The optical delay device 84A delays, based on an instruction of the controller 88 explained below, the first and third continuous oscillation lights output from the polarization controller 83A and outputs the delayed first and third continuous oscillation lights to the optical coupler 85.

The optical delay device 84B delays, based on an instruction of the controller 88, the second and fourth continuous oscillation lights output from the polarization controller 83B and outputs the delayed second and fourth continuous oscillation lights to the optical coupler 85.

The optical coupler 85 multiplexes the first and third continuous oscillation lights of the horizontal polarized wave and the second and fourth continuous oscillation lights of the vertical polarized wave and outputs the multiplexed continuous oscillation lights to the optical splitter 86. A polarization beam splitter, a wavelength-selective switch, and the like may be provided instead of or together with the optical coupler 85.

The optical splitter 86 divides the first to fourth continuous oscillation lights output from the optical coupler 85 and outputs one of the divided continuous oscillation lights to the optical filter 87A and outputs the other to the optical filter 87B.

The optical filter 87A does not transmit the third and fourth continuous oscillation lights and transmits the first and second continuous oscillation lights from the first to fourth continuous oscillation lights output from the optical splitter 86. The control light generator 56 outputs a multiplexed wave of the first and second continuous oscillation lights as first control light.

The optical filter 87B does not transmit the first and second continuous oscillation lights and transmits the third and fourth continuous oscillation lights from the first to fourth continuous oscillation lights output from the optical splitter 86. The control light generator 56 outputs a multiplexed wave of the third and fourth continuous oscillation lights as second control light.

For example, the optical filter 87A transmits low-frequency continuous oscillation light and the optical filter 87B transmits high-frequency continuous oscillation light, and vice versa. Consequently, a combination of the first and second continuous oscillation lights and a combination of the third and fourth continuous oscillation lights having a difference between frequencies of $\Delta v$ may be extracted. However, frequency bands transmitted by the optical filters 87A and 87B are not limited to this. In the tenth embodiment, the optical splitter 86 and the optical filters 87A and 87B correspond to the control-light output unit.

The respective first, second, third, and fourth continuous oscillation lights in the tenth embodiment may be caused to correspond to the respective first, second, fourth, and third continuous oscillation lights in the second embodiment and may be caused to correspond to the respective first, second, third, and fourth continuous oscillation lights in the third and fourth embodiments. However, the correspondence of the continuous oscillation lights is not limited to this.

The controller 81 determines, based on information concerning the frequencies of signal light before and after wavelength conversion, the frequencies of $v_1$, $v_2$, $v_3$, and $v_4$ of the continuous oscillation lights transmitted by the wavelength-selective switch 82 and controls the wavelength-selective switch 82 to transmit the continuous oscillation lights having the determined frequencies.

The controller 88 calculates, based on the intensity of the signal light after the wavelength conversion, first and second optical delay amounts, a delay amount of the third continuous oscillation light (a third optical delay amount), and a delay amount of the fourth continuous oscillation light (a fourth optical delay amount). The third and fourth optical delay amounts correspond to aligning timings of phase modulation of the third continuous oscillation light and the fourth continuous oscillation light. According to an instruction of the controller 88, the optical delay device 84A delays, based on the first optical delay amount, the first continuous oscillation light and delays, based on the third optical delay amount, the third continuous oscillation light. According to an instruction of the controller 88, the optical delay device 84B delays, based on the second delay amount, the second continuous oscillation light and delays, based on the fourth optical delay amount, the fourth continuous oscillation light. In the tenth embodiment, the controller 88 corresponds to the phase controller.

According to the tenth embodiment, the frequencies of the continuous oscillation lights in the first control light and the frequencies of the continuous oscillation lights in the second control light may be different. Consequently, it is possible to extract continuous oscillation light having a frequency adjusted to characteristics and the like of a nonlinear optical medium according to circumstances. Since flexibility of selection of frequencies increases, it is possible to reduce consumed energy.

Various embodiments and modifications of the present disclosure are possible without departing from the spirit and the scope of the present disclosure in a broad sense. The embodiments explained above are for explanation of the present disclosure and are not for limitation of the scope of the present disclosure. Various modifications applied within the scope of claims and a scope of the significance of the present disclosure equivalent to the scope of claims are also considered to be within the scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control-light generation device used in a wavelength conversion device that converts input signal light having a first frequency into output signal light having a second frequency that is in an in-phase or phase conjugate with the input signal light, the control-light generation device comprising:

a light source that generates first continuous oscillation light and second continuous oscillation light having a frequency interval equal to a difference between the first frequency and the second frequency;

a phase controller that controls, based on intensity of the output signal light, timings of modulation of phases of the first continuous oscillation light and the second continuous oscillation light to be aligned with each other; and an optical splitter that outputs polarized waves of the first continuous oscillation light and the second continuous oscillation light in a state in which the polarized waves are orthogonal to each other.

2. The control-light generation device according to claim 1, wherein
   the light source generates third continuous oscillation light and fourth continuous oscillation light having a frequency interval equal to the difference between the first frequency and the second frequency,
   the phase controller controls, based on the intensity of the output signal light, timings of modulation of phases of the third continuous oscillation light and the fourth continuous oscillation light to be aligned with each other, and
   the optical splitter that outputs polarized waves of the third continuous oscillation light and the fourth continuous oscillation light in a state in which the polarized waves are orthogonal to each other.

3. The control-light generation device according to claim 1, wherein the intensity is calculated using a low-frequency component of the output signal light.

4. The control-light generation device according to claim 1, further comprising a polarization converter and multiplexer configured to control the polarized wave of the first continuous oscillation light and the polarized wave of the second continuous oscillation light to be in a same direction and multiplex the polarized wave of the first continuous oscillation light and the polarized wave of the second continuous oscillation light, wherein
   the phase controller collectively controls phases of the multiplexed first and second continuous oscillation lights, and
   the control-light generation device further comprises a polarization controller configured to control the polarized wave of the first continuous oscillation light and the polarized wave of the second continuous oscillation light to be in directions orthogonal to each other.

5. The control-light generation device according to claim 1, wherein the light source is an optical comb device.

6. A control-light generation method used in wavelength conversion for converting input signal light having a first frequency into output signal light having a second frequency that is in an in-phase or phase conjugate with the input signal light, the control-light generation method, executed by a control-light generation device, comprising:

generating first continuous oscillation light and second continuous oscillation light having a frequency interval equal to a difference between the first frequency and the second frequency;

controlling, based on intensity of the output signal light, timings of modulation of phases of the first continuous oscillation light and the second continuous oscillation light to be aligned with each other; and outputting polarized waves of the first continuous oscillation light and the second continuous oscillation light in a state in which the polarized waves are orthogonal to each other.

* * * * *